US011925942B2

(12) United States Patent
Reznitchenko et al.

(10) Patent No.: US 11,925,942 B2
(45) Date of Patent: Mar. 12, 2024

(54) ROLLER CRUSHER AND METHOD FOR OPERATING THEREOF

(71) Applicant: Metso Outotec USA Inc., Waukesha, WI (US)

(72) Inventors: Vadim Reznitchenko, Mechanicsburg, PA (US); Keith Harbold, York, PA (US); Brian Eric Behm, Red Lion, PA (US)

(73) Assignee: Metso Outotec USA Inc., Waukesha, WI (US)

( * ) Notice: Subject to any disclaimer, the term of this patent is extended or adjusted under 35 U.S.C. 154(b) by 114 days.

(21) Appl. No.: 17/507,919

(22) Filed: Oct. 22, 2021

(65) Prior Publication Data

US 2023/0126189 A1 Apr. 27, 2023

(51) Int. Cl.
*B02C 4/02* (2006.01)
*B02C 4/40* (2006.01)
*B02C 25/00* (2006.01)

(52) U.S. Cl.
CPC .................. *B02C 4/40* (2013.01); *B02C 4/02* (2013.01); *B02C 25/00* (2013.01)

(58) Field of Classification Search
CPC .. B02C 25/00; B02C 4/40; B02C 4/02; B02C 4/28
See application file for complete search history.

(56) References Cited

U.S. PATENT DOCUMENTS 373,408 A * 11/1887 Mawhood ............... B02C 4/286 341/135
743,955 A * 11/1903 Thompson .......... B02C 18/0007 241/167
1,906,792 A 5/1933 Gwillim
2,125,859 A 8/1938 Liebelt
3,404,424 A 10/1968 Drayton
(Continued)

FOREIGN PATENT DOCUMENTS

AU 2018264756 A1 9/2021
CN 104307592 A 1/2015
(Continued)

OTHER PUBLICATIONS

International Search Report and Written Opinion for PCT/US2022/046821, dated Feb. 22, 2023.
(Continued)

*Primary Examiner* — Faye Francis
(74) *Attorney, Agent, or Firm* — Andrus Intellectual Property Law, LLP

(57) ABSTRACT

A roller crusher having two generally parallel rollers arranged to rotate in opposite directions, towards each other, and separated by a gap, where each roller having two ends. The roller crusher includes a flange attached to at least one of the ends of one of the rollers. The roller crusher further includes at least one mechanical scraper and a remote material removal device configured to output a material removing beam towards a target area. The at least one mechanical scraper and the remote material removal device are arranged consecutive to each other at an end of the roller with a flange for at least partially removing material accumulated on the flange and/or on the outer surface at the end of the roller. A method for operating a roller crusher is also provided.

23 Claims, 11 Drawing Sheets

(56) References Cited

U.S. PATENT DOCUMENTS

| | | | |
|---|---|---|---|
| 4,357,287 | A | 11/1982 | Schonert |
| 4,434,522 | A | 3/1984 | Linzberger |
| 4,973,001 | A | 11/1990 | Kaestingschaefer et al. |
| 5,054,701 | A | 10/1991 | Durinck |
| 5,269,477 | A | 12/1993 | Buchholtz |
| 6,685,118 | B1 | 2/2004 | Williams |
| 2005/0263625 | A1 | 12/2005 | Macaluso et al. |
| 2016/0243556 | A1 | 8/2016 | Giesemann et al. |
| 2021/0213456 | A1 | 7/2021 | Mark et al. |
| 2022/0250081 | A1 | 8/2022 | Schroers |

FOREIGN PATENT DOCUMENTS

| | | | | | |
|---|---|---|---|---|---|
| CN | 112517618 | A | | 3/2021 | |
| CN | 115104741 | A | * | 9/2022 | ............... B02C 4/28 |
| DE | 457037 | C | | 3/1928 | |
| DE | 3526260 | A1 | | 1/1987 | |
| DE | 202014006837 | U1 | | 9/2014 | |
| EP | 0040432 | B1 | * | 3/1984 | ............... B02C 4/40 |
| GB | 397597 | A | | 8/1933 | |
| JP | H09290170 | A | | 11/1997 | |
| WO | 9637306 | A1 | | 11/1996 | |
| WO | 2013156586 | A2 | | 10/2013 | |
| WO | 2013156968 | A1 | | 10/2013 | |
| WO | 2013158346 | A1 | | 10/2013 | |
| WO | 2020260307 | A1 | | 12/2020 | |

OTHER PUBLICATIONS

International Search Report and Written Opinion for PCT/US2022/046822, dated Feb. 22, 2023.

Office Action for U.S. Appl. No. 17/507,917, dated Jan. 25, 2023.

Office Action for U.S. Appl. No. 17/507,913, dated Feb. 6, 2023.

Office Action for U.S. Appl. No. 17/507,917, dated May 16, 2023.

Shear Scraping, retrieved date May 25, 2023. https://blog.woodturnerscatalog.com/2014/05/shear-scraping/.

Pulverization 1_Definition and purpose, retrieved date May 25, 2023. https://www.thinkymixer.com/en-us/library/glossary/pulverization-1-definition-and-purpose/.

Office Action for U.S. Appl. No. 17/507,913, dated May 26, 2023.

International Search Report and Written Opinion for International Application No. PCT/US2022/046820, dated Oct. 17, 2022.

Mular, M.A. et al., "Design and operation of the Metcalf Concentrator comminution circuit", SAG 2015 Conference Proceedings, Sep. 20-24, 2015, Vancouver, BC.

Herman, V.S. et al., "Building the world's largest HPGR—the HRCTM 3000 at the Morenci Metcalf concentrator", SAG 2015 Conference Proceedings, Sep. 20-24, 2015, Vancouver, BC.

* cited by examiner

ROLLER CRUSHER AND METHOD FOR OPERATING THEREOF

FIELD OF THE INVENTION

The present disclosure relates to a roller crusher having two generally parallel rollers, wherein the roller crusher comprises a flange attached to at least one of the ends of one of the rollers. The present disclosure further relates to a method for operating a roller crusher.

BACKGROUND

When crushing or grinding rock, ore, cement clinker and other hard materials, roller crushers may be used having two generally parallel rolls which rotate in opposite directions, towards each other, and which are separated by a gap. The material to be crushed is then fed into the gap. One type of roller crusher is called high pressure grinding rollers or high pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases may be achieved. This crushing technique is called interparticle crushing. Here, the material to be crushed or pulverized is crushed, not only by the crushing surfaces of the rolls, but also by particles in the material to be crushed, hence the name interparticle crushing. U.S. Pat. No. 4,357,287 specifies that such agglomeration may be achieved by using much higher compression forces then what was previously done. As an example, forces up to 200 kg/cm2 were previously used, whereas the solution in U.S. Pat. No. 4,357,287 suggests to use forces of at least 500 kg/cm2 and up to 1500 kg/cm2. In a roller crusher having a roller diameter of 1 meter, 1500 kg/cm2 would translate into a force of more than 200 000 kg per meter length of the rollers whereas previously known solutions could, and should, only achieve a fraction of these forces. Another property of the interparticle crushing is that a roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained.

Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In order to maintain crushing effect all along the length of the grinding rollers, flanges may be arranged to ends of the crushing rolls; one flange at each end of one roll, or one flange at one end of each roll, but on opposite ends of the roller crusher. With such an arrangement, it is possible to create a more efficient and uniform roll feed entry. The flanges will allow for material being fed such that a preferred material pressure is created over the entire length of the crusher rolls. It has been shown that it is possible to increase capacity of a given roller crusher with up to 20%, or sometimes even more, by using flanges. A general problem associated with grinding rollers without flanges is that the ratio between the roller diameter and the roller width is very important due to a significant edge effect, i.e. the crushing result is reduced at the edges of the rollers. This is because of the fact that material may escape over the edges of the rollers thereby reducing the crushing pressure on the material towards the gap at the edges of the rollers. Without flanges, it is thus necessary to recycle both material escaping the rolls and some of the material having passed the gap at the edges of the crusher rolls due to a lower pressure resulting in reduced breakage at the edges.

However, during operation of a grinding crusher with flanges, the flanges and also edges of opposite crusher roller is under a lot of stress and wear, and build-up material will gather in the transition between the crusher roller surface and the flange. Such excessive build-up material needs to be removed consistently during operation of the grinding crusher.

Prior art has suggested a scraper element for removing build-up material in the transition between the crusher roller surface and the flange, see for example AU2018264756 or U.S. Pat. No. 5,054,701.

Proceeding therefrom, it is an object of the present disclosure to provide a roller crusher having flanges, wherein the flanges and edges of opposing roller crusher ends are subjected to less stress and wear.

SUMMARY

According to a first aspect of the disclosure, this and other objects are achieved, in full or at least in part, by a roller crusher having two generally parallel rollers arranged to rotate in opposite directions, towards each other, and separated by a gap, each roller having two ends, the roller crusher comprising:

- a flange attached to at least one of the ends of one of the rollers,
- the flange extending in a radial direction of the roller,
- the flange having a height (H) above an outer surface of the roller, wherein the roller crusher further comprises at least one mechanical scraper and a remote material removal device configured to output a material removing beam towards a target area, wherein the at least one mechanical scraper and the remote material removal device are arranged consecutive to each other at an end of the roller with a flange for at least partially removing material accumulated on the flange and/or on the outer surface at the end of the roller.

The term "remote material removal device" should herein be construed as a device which can output a beam towards a target area disposed remotely to the device, which beam has material-removing capability. This implies that, contrary to the at least one mechanical scraper, the remote material removal device is not in contact with the material to be removed. Instead, the material is removed by means of the material removing beam. The material removing beam has a defined beam direction. This implies that the target area may be selected by adjusting the direction of the material removing beam. Dependent on the type of remote material removal device, the material is removed by different processes, such as e.g. mechanical impact, heating, ablation, exothermic reactions etc.

The term "target area" should herein be construed as a finite area or region which may be defined on a physical object towards which the material removing beam of the remote material removal device is directed. The area is finite as a result from the material removing beam having a defined direction, thereby implying that the material removing beam has a defined spatial beam cross section, or beam profile. The spatial beam cross section may be defined by the physical properties of the beam as function of radial distance from a beam direction axis. Said physical properties may have a non-uniform distribution. This implies that material removing efficiency may vary within the target area. However, material will be removed in all parts of the target area. The target area may be defined on the roller surface and/or on the inner surface of the flange. Alternatively, the target areas may be defined on the build-up material accumulated on the flange and/or on the outer surface of the roller. There is an important distinction between the two alternatives: In the former case, the material removing beam will, once any build-up material has been removed, impinge on the roller surface and/or the inner surface of the flange. This may be advantageous as it allows to efficiently and reliably provide a complete cleaning of said surfaces. However, there may be a risk to unintentionally damage said surfaces by removing roller surface material and/or flange surface material with the material removing beam. For such cases, the latter alternative may be beneficial. Here, the target area is selected such that the material-removing beam does not impinge on the roller surface and/or the inner surface of the flange, which surfaces are therefore protected from the material removing beam at all times. The latter alternative may be provided by directing the material removing beam substantially tangential to the roller surface at an end of the roller with a flange.

The phrasing "remote material removal device arranged [ . . . ] at the end of the roller" should herein be construed as the remote material removal device being arranged at a position at which the remote material removal device is functionally capable of providing a sufficient material removal at the intended target area, i.e. an area defined on build-up material present at the outer surface at the end of the roller and/or the flange. As readily appreciated by the person skilled in the art, the efficiency of material removal will depend both on the distance between the remote material removal device and the target area, and the angle formed between the material removing beam and the target area. The distance may be within the range 50-500 mm from the target area. As also readily appreciated by the person skilled in the art, a back portion of the remote material removal device, which may have an elongated body, may therefore be located at some distance from the flange and the outer surface of the end of the roller.

A first advantage of the at least one mechanical scraper and remote material removal device arranged consecutive to each other is to provide a more reliable system for keeping build-up material at the flange within acceptable levels. The at least one mechanical scraper will provide a continuous scraping operation. Hence, the at least one mechanical scraper will be ready to remove material at any given time during operation. However, since the mechanical scrapers are removing material by mechanical interaction with the build-up material, the at least one mechanical scraper will be subjected to wear. As the roller crusher is started up with clean rollers without any build-up material at the flanges, material will, during the first time period of crushing operation, accumulate in the corner transition between the roller surface and the flange so as to create a material build-up. During the first time period after startup, such as e.g. the first hour in operation, the material buildup will be relatively soft through the depth of the material, and the mechanical scraper will therefore be able to remove any excess buildup effectively at an acceptable wear rate of at least one mechanical scraper and acceptable mechanical stress levels on the fixture holding the at least one mechanical scrapers in place in relation to the roller crusher. However, after continuous operation of the crusher during a longer time period, the material buildup will get increasingly more compacted and thus harden through the depth of the material. This will increase the wear rate of at least one mechanical scraper as well as the mechanical stress levels on the fixture holding the at least one mechanical scrapers in place in relation to the roller crusher. This problem is solved by removing buildup material before it has become too hard by means of the remote material removal device. By applying a material removing beam onto a target area located at an end of the roller with a flange, the beam may remove, in part or in full, the material build-up located there. By removing the build-up, the wear life of the mechanical scraper and its holding fixture will be increased, thus providing a more reliable system for keeping build-up material at the flange within acceptable levels.

Another advantage of the at least one mechanical scraper and remote material removal device arranged consecutive to each other is to provide a more flexible and controllable system for removing material accumulated on the grinding rollers during operation. Whereas the mechanical scrapers are always in operation, the remote material removal device may be controlled. Such control may for example be initiating remote material removal at consecutive time periods. The time periods may be chosen based on the conditions at the site, i.e. material to be crushed, humidity, temperature etc. Alternatively, a feedback control system may be used. However, the obvious drawbacks of remote material removal devices, such as e.g. a reliable supply of power, pressurized water or air, the dust creating etc. may be minimized by only selectively operating the remote material removal device when it is best needed. Remaining material removal is then left for the mechanical scraper.

Another advantage of the at least one mechanical scraper and remote material removal device arranged consecutive to each other is to more easily allow controlling the amount of material which is removed. During a normal crushing operation, a complete removal of the build-up material is not required. It may suffice to remove the upper layers of the material to ensure that the build-up does not come in contact with the adjacent roller. However, in some situations, e.g. when the roller crusher is shut down for maintenance and replacement of the mechanical scrapers, a complete removal of the buildup may be beneficial, as it reduced the risk that build-up material may be in the way of newly attached mechanical scrapers.

As readily appreciated by the person skilled in the art from what has been stated hereinabove, the combination of at least one mechanical scraper and a remote material removal device will act in synergy due to their different strengths and weaknesses.

According to an embodiment, the at least one mechanical scraper and the remote material removal device are arranged at a lower part of the roller crusher. Preferably, the target area is located at a lower part of the roller crusher. This implies that parts of the remote material removal device may be disposed in the upper part of the roller crusher, but the material removing beam may be directed towards a target area being located at a lower part of the roller crusher.

The phrasing “lower part of the roller crusher” should here be construed broadly. The terminology is here intended to cover all positions of the at least one scraper which will be located below a plane defined by the two rotational axes of the crusher rollers. Thus, the above embodiment may alternatively be expressed as wherein the at least one scraper is arranged such that scraping surfaces of the at least one scraper is located below a substantially horizontal plane which intersects both rotational axes of the crusher rollers.

This may be advantageous as it allows for the material to leave the crusher roller by output together with the crushed material at the lower end of the roller crusher.

According to an embodiment, the at least one scraper is arranged at about 6 to 9 o’clock, 7-9 o’clock or 7-8 o’clock of the roller, when viewing the roller from a side showing clockwise rotation.

According to an embodiment, the target area of the remote material removal device is arranged at about 6 to 9 o’clock, 7-9 o’clock or 7-8 o’clock of the roller, when viewing the roller from a side showing clockwise rotation.

According to an embodiment, the at least one mechanical scraper is arranged such that a scraping surface of the at least one scraper at least partly face downwards for allowing removed material to leave from the roller and scraping surface by gravitational force.

This may be advantageous as it prevents scraped of material to accumulate on the scraping surface which may risk material deposition on said surfaces.

According to an embodiment, the remote material removal device is a fluid jet knife.

The term “fluid jet knife” should herein be construed as a device having a pressurized fluid plenum which contains one or more holes or continuous slots through which a pressurized fluid exits in the form of a fluid plume during operation of the fluid jet knife. The fluid may be a liquid fluid such as e.g. water. This implies that the fluid jet knife may be a water jet knife. Alternatively, the fluid may be a gaseous fluid such as e.g. air.

According to an embodiment, the fluid jet knife device is an air knife.

The term “air knife” should herein be construed as a device having a pressurized air plenum which contains one or more holes or continuous slots through which pressurized air exits in the form of an air plume during operation of the air knife. The exit air velocity of the air plume then creates an impact air velocity onto an impact region of a surface of whatever object the air is directed. The impact air velocity is chosen depending on the purpose and may therefore, in general, range from a gentle breeze to greater than Mach 0.6 (40,000 ft/min), the highest velocities typically being applied to alter the surface of a product without mechanical contact. Industrial air knives are often designed to provide an air sheet, i.e. an air plume having a substantially planar geometrical shape. However, in the context of the present application, the air knife may provide a material removing beam in the form of an air plume having any shape as long as said air knife allows at least partial removal of material accumulated on the flange and/or on the outer surface at the end of the roller.

According to an embodiment, a target area of the remote material removal device is located in front of the at least one mechanical scraper.

The term “target area” means the portion of the surface area of the roller and/or the portion of the inner surface of the flange and/or the portion of an outer surface of the material build-up that may be accumulated on the flange and/or on the outer surface at the end of the roller which will be impacted by the material removing beam during operation of the remote material removal device at any moment in time. Thus, the target area is located generally in front of the remote material removal device. The target area is also referred to herein as the “impact region”.

The phrasing “in front of” means that during rotation of the roller, a specific area or spot on the outer surface of the roller and/or the flange will, if the remote material removal device is active, first be under impact of the remote material removal device and thereafter pass by or be scraped by the at least one mechanical scraper. Thus, the target area of the remote material removal device will be acting upon accumulated material in a specific area or spot of the outer surface of the roller and/or the flange before the mechanical scraper may affect or scrap any material of the same area or spot of the outer surface of the outer surface of the roller and/or the flange.

As discussed above, the operation of the remote material removal device may be controlled, while a mechanical scraper always is in operation, and initiating operation of the remote material removal device at consecutive time periods, and arranging the target area of the remote material removal device in front of the at least one mechanical scraper, will be advantageous as the wear of the mechanical scraper may be decreased and thereby prolong operational time.

According to an embodiment, the material removing beam is directed opposite to a tangential velocity of the roller at the impact region.

According to an embodiment, the roller crusher further comprises a wear-protective arrangement for the remote material removal device.

This may be advantageous as the remote material removal device is positioned in a region of high wear of material being crushed and grinded between the two rollers. The beam output of the remote material removal device needs a wear-protective arrangement to safeguard prolonged operational time.

According to an embodiment, the wear-protective arrangement has an opening through which the material removing beam of the remote material removal device exits.

According to an embodiment, the wear-protective arrangement further comprises a wear guard for protecting a body of the remote material removal device.

According to an embodiment, the scraping surface of the at least one mechanical scraper is arranged such that a distance between the outer surface of the roller and the scraping surface decreases towards the flange.

This may be advantageous as this allows for material to more easily be transported away from the corner between the flange and the outer surface of the roller once scraped off, thus contributing to an efficient material removal process.

According to an embodiment, the at least one mechanical scraper is arranged at a distance of at least 31.5 mm. This implies that each of the at least two scrapers may be arranged such that a minimum roller surface distance between each scraping surface of the scraper and the outer surface of the roller is at least 31.5 mm.

According to an embodiment, the at least one scraper has a fastening position located at a distance from the outer surface of the roller, wherein the at least one scraper is arranged such that a position of a scraping surface of the at least one scraper is located at, or consecutive to, a radial axis which extends from a rotational axis of the roller and through the fastening position.

The phrasing “consecutive to” means that a spot of the outer surface of the roller travels during rotation of the roller firstly past the radial axis which extends from a rotational axis of the roller through the respective fastening position or common fastening position and consecutively thereafter past the scraper surface of the at least one scraper. Thus, seen in the rotation direction of the roller, the scraper surface is positioned consecutively to the radial axis which extends from a rotational axis of the roller through the respective fastening position or common fastening position.

This may be advantageous if material accumulated on the flange and/or on the outer surface at the end of the roller has become too hard to be removed and the at least one scraper hits the non-removable material will full impact, the attachment of the scraper to the roller crusher may be broken. When such de-attachment takes place, the at least one scraper will with this arrangement move away from the outer surface of the roller rather than hitting the outer surface of the roller at the end of the roller.

For this de-attachment, the at least one scraper may be fastened rigidly. However, such the rigid fastening may be configured to endure impact forces up to a predetermined threshold force to ensure that the flanges or the outer surface at the end of the roller do not risk of becoming damaged by a collision between a scraper and the non-removable material.

In another embodiment, the at least one scraper may be pivotably fastened and biased towards a working position for the at least one scraper. The bias should be in the magnitude to keep the at least one scraper in working position up to a predetermined threshold force. Again, such a predetermined threshold force is set to ensure that the flanges and/or the outer surface at the end of the roller do not risk of becoming damaged by a collision between a scraper and the non-removable material. It is also conceivable to use an unbiased pivotably fastening combined with a torque-limiter. For such an embodiment, the at least one scraper would be seemingly rigidly attached to the roller crusher until the at least one scraper has been exposed to a force exceeding a certain threshold force at which the torque limiter is activated and the at least one scraper is allowed to swingably move away from the roller surface.

The phrase "working position" means the position for the scraper in relation to the outer surface at the end of the roller and the flange for at least partially removing material accumulated on the flange and/or on the outer surface at the end of the roller.

According to one embodiment, the target area of the remote material removal device is located in front of the at least one mechanical scraper and the roller crusher further comprises a holding fixture for the at least one mechanical scraper which holding fixture has the opening through which the material removing beam of the remote material removal device exits and which holding fixture forms part of the wear-protective arrangement.

The phrasing "in front of" means that a specific spot on the outer surface of the roller will, if the remote material removal device is active, first be under impact of the remote material removal device and thereafter be scraped by the at least one scraper.

According to one embodiment the holding fixture hold both the at least one mechanical scraper and the remote material removal device.

According to one embodiment, the remote material removal device is arranged on the roller crusher such that a direction of the material removing beam is adjustable.

According to one embodiment, the roller crusher further comprises a controller configured to control operation of the remote material removal device to allow intermittently removing material accumulated on the flange and/or on the outer surface at the end of the roller by means of the remote material removal device.

With the phrase "intermittently removing material" is means that material is removed at irregular or regular time intervals, but not continuously or steadily.

This may be advantageous, whereas the mechanical scrapers are always in operation, the operation of the remote material removal device may be controlled by the controller. The controller may for example initiate operation of the remote material removal device at consecutive time periods. The time periods may be chosen based on the conditions at the site, i.e. material to be crushed, humidity, temperature etc.

According to one embodiment, the roller crusher further comprises a roller crusher monitoring system configured to determine roller crusher monitoring system data pertaining to the build-up level of material accumulated on the flange and/or on the outer surface at the end of the roller, and wherein the controller is configured to control operation of the remote material removal device based on said roller crusher monitoring system data.

According to one embodiment, the roller crusher monitoring system comprises one or more from:

- at least one monitoring camera arranged to monitor the at least one mechanical scraper and/or the remote material removal device,
- at least one strain gage arranged on the at least one mechanical scraper and/or on a scraper fixture, and
- at least one strain gage arranged on the flange.

According to an embodiment, the at least one mechanical scraper comprises a trigger scraper positioned at a maximum tolerable distance from the roller surface and/or inner surface of the flange, which trigger scraper is configured to initiate a trigger signal to a control system of the roller crusher upon impact with accumulated built-up material remaining on the flange and/or the outer surface at the end of the roller.

According to an embodiment, such a trigger signal may involve initiating a planned service shutdown for exchange of the at least one scraper.

According to an embodiment, such a trigger scraper positioned at a maximum tolerable distance to the flange and/or the outer surface at the end of the roller comprises a built-in sensor, such as an accelerometer, or a strain gauge. Alternatively, the trigger scraper may be mounted on a holding fixture having a built-in sensor. Alternatively, the holding fixture may be attached to a frame of the roller crusher at a fastening position, and a sensor may be arranged in, or at, said fastening position and configured to output a trigger signal in response to mechanical impact to the trigger scraper. Thus, term "trigger scraper" should not be construed as meaning a special kind of scraper per se. A trigger scraper may be identical to any other scraper disclosed herein. The term is instead used to identify a specific scraper among the at least one scraper which specific scraper is configured to act as a sensing means to provide information pertaining the material build-up. This may be accomplished in different ways as long as mechanical interaction between the build-up material and the trigger scraper is converted to an output signal.

By "maximum tolerable distance" is means a predefined distance beyond which the build-up material should not be allowed to pass. In other words, if the material build-up reaches the maximum tolerable distance, the build-up must be removed, or the machine shut down.

According to a second aspect of the disclosure, this and other objects are also achieved, in full or at least in part, by a method for operating a roller crusher for grinding granular material, wherein the roller crusher has two generally parallel rollers arranged to rotate in opposite directions, towards each other, and separated by a gap, each roller having two ends, the roller crusher comprising:

a flange attached to at least one of the ends of one of the rollers, the flange extending in a radial direction of the roller, the flange having a height (H) above an outer surface of the roller, wherein the roller crusher further comprises at least one mechanical scraper and a remote material removal device configured to transmit a material removing beam towards a target area, wherein the at least one mechanical scraper and the remote material removal device are arranged consecutive to each other at an end of the roller with a flange, wherein the method comprises at least the steps of:

a) at least partially removing material accumulated on the flange and/or on the outer surface at the end of the roller by means of the at least one mechanical scraper; and b) at least partially removing material accumulated on the flange and/or on the outer surface at the end of the roller by means of the remote material removal device, wherein step a) is performed continuously and wherein step b) is performed at least intermittently.

According to an embodiment of the second aspect, step a) results in a first thickness of accumulated material remaining on the flange and/or on the outer surface at the end of the roller, and step b) results in a second thickness of accumulated material remaining on the flange and/or on the outer surface at the end of the roller, and wherein the first thickness is larger than the second thickness.

According to an embodiment of the second aspect, step b) is performed within predetermined time ranges.

According to an embodiment of the second aspect, the at least one mechanical scraper comprises a trigger scraper positioned at a maximum tolerable distance from the roller surface and/or inner surface of the flange, which trigger scraper is configured to initiate step b) upon impact with accumulated material remaining on the flange and/or on the outer surface at the end of roller.

Again, by "maximum tolerable distance" is means a predefined distance beyond which the build-up material should not be allowed to pass. In other words, if the material build-up reaches the maximum tolerable distance, the build-up must be removed, or the machine shut down.

By "trigger scraper" is means a scraper which, when contacting build-up material, is capable of providing a trigger signal to initiate remote material removal, i.e. step b). The trigger scraper may be a conventional scraper having triggering capability. This may be accomplished in different ways. For example, the trigger scraper may have a built-in sensor, such as an accelerometer, or a strain gauge. Alternatively, the trigger scraper may be mounted on a holding fixture having a built-in sensor. Alternatively, the holding fixture may be attached to a frame of the roller crusher at a fastening position, and a sensor may be arranged in, or at, said fastening position and configured to output a trigger signal in response to mechanical impact to the trigger scraper. Thus, term "trigger scraper" should not be construed as meaning a special kind of scraper per se. A trigger scraper may be identical to any other scraper disclosed herein. The term is instead used to identify a specific scraper among the at least one scraper which specific scraper is configured to act as a sensing means to provide information pertaining the material build-up. This may be accomplished in different ways as long as mechanical interaction between the build-up material and the trigger scraper is converted to an output signal.

According to an embodiment of this second aspect, step b) is performed at time positions determined by roller crusher monitoring system data pertaining to the build-up level of material accumulated on the flange and/or on the outer surface at the end of the roller.

According to an embodiment of this second aspect, step b) is performed prior to shut-down of the roller crusher for allowing removing material accumulated on the flange and/or on the outer surface at the end of the roller for facilitating replacement of the at least one mechanical scraper.

According to a third aspect of the disclosure, there is provided a roller crusher having two generally parallel rollers arranged to rotate in opposite directions, towards each other, and separated by a gap, each roller having two ends, the roller crusher comprising:

a flange attached to at least one of the ends of one of the rollers, the flange extending in a radial direction of the roller, the flange having a height above an outer surface of the roller, and a movement blocking arrangement structured and arranged to limit the gap between the rollers to a minimum gap of at least 45 mm, wherein the roller crusher further comprises at least one scraper positioned at an end of the roller with a flange, and wherein the scraper is positioned such that a minimum roller surface distance between each scraping surface of the at least one scraper and the outer surface of the roller is at least 70% of the minimum gap.

The roller crusher of the third aspect may be advantageous as it allows selectively removing built-up material only to the extent necessary to avoid any detrimental effects the build-up may have on the flange and on the edges of the opposite crusher roller. Selectively removing only the material which is absolutely necessary to remove is beneficial for several reasons. Firstly, the overall wear of the at least one scraper will be reduced since the at least one scraper is exposed to a significantly less degree of wear when positioned further away from the roller surface. Moreover, it is well known that the risk of an unplanned scraper malfunction, such as severe and instant scraper structural damage and/or even a torn-off of the scraper from the roller crusher will increase with decreasing distance from the roller surface. This is because the mechanical stress on the at least one scraper will be significantly increased when being located close to the roller surface. Thus, the inventive concept is also associated with a prolonged durability of the at least one scraper, and a lowered risk of unplanned malfunction events during operation. Avoiding these unplanned malfunction events is advantageous as it reduces overall downtime and, importantly, reduces the risk of unplanned blockage in the material chain at the plant, an unplanned blockage which usually will require an unplanned and sometimes challenging shutdown of several adjacent processing machines at the plant to avoid accumulating excess feed material at the shut-down roller crusher.

As readily appreciated by the person skilled in the art, in order to prevent any detrimental effects of the build-up material on the roller crusher, the largest possible distance between the scraper and the roller surface will be equal to the minimum gap. At this limit, the scraper will be able to remove enough material for allowing the two rollers to move with respect to each other without risking the build-up material to detrimentally affect the flange and on the edges of the opposite crusher roller e.g. by impact or compression forces. However, since scrapers are constantly subjected to wear during operation, positioning the scraper at this distance may not be preferred, because the scraper wear will effectively remove material from the scraper hence increasing the distance with increasing time of crusher operation. It has been realized from extensive testing that by placing a scraper at a minimum distance from the roller with the flange (i.e. the roller at which material build-up occurs) which is at least 70% of the minimum gap, the roller crusher may be in operation for economically acceptable time periods, the scraper has been worn down to an extent at which the distance between the scraper and the outer surface of the roller will be close to the minimum gap, and the scraper has to be either adjusted in position or replaced.

The term “movement blocking arrangement” should be construed as any arrangement on a roller crusher which is capable of physically preventing the rollers from getting closer to each other than what is specified by the minimum gap. For roller crushers where only one roller is movable in relation to the crusher frame, the movement blocking arrangement may act on the movable roller only. The movement blocking arrangement may be realized for example by providing mechanical blocking elements arranged at bearing houses supporting a movable roller in the frame. However, as readily appreciated by the person skilled in the art, there are many alternative means of providing such a mechanical movement blocking. The movement blocking arrangement may be structured and arranged to be adjustable so as to allow adjusting the minimum gap.

According to an embodiment, the at least one scraper is positioned such that a minimum flange distance between each scraping surface of the at least one scraper and an inner surface of the flange is 1-25 mm.

Preferably, the at least one scraper is positioned such that a minimum flange distance between each scraping surface of the at least one scraper and an inner surface of the flange is at least 11 mm.

According to an embodiment, the at least one scraper is positioned such that a minimum flange distance between each scraping surface of the at least one scraper and an inner surface of the flange is 15-20 mm.

This embodiment is associated with substantially the same advantages as has been detailed with reference to the first aspect. Specifically, by allowing at least 11 mm to the flange, the risk of flange bending has been found to be significantly reduced. Flange bending is unwanted as it will allow material to slip out from the crusher gap at the sides, hence leading to parts of the material bypassing the roller crusher, with an end result that the material output from the roller crusher will not have the specified size distribution.

According to an embodiment, the movement blocking arrangement is structured and arranged to limit the gap between the rollers to a minimum gap of at least 50 mm. It is also conceivable that the movement blocking arrangement is structured and arranged to limit the gap between the rollers to a minimum gap of at least 55 mm, or at least 60 mm or at least 65 mm or at least 70 mm. As readily appreciated by the person skilled in the art, the minimum gap may depend on many factors, such as e.g. on the dimensions of the crusher rollers and/or the dimensions and material properties of the material to be crushed.

According to a fourth aspect of the disclosure, there is provided a method for arrangement of a roller crusher, which roller crusher has two generally parallel rollers arranged to rotate in opposite directions, towards each other, and separated by a gap, each roller having two ends, the roller crusher comprising:

- a flange attached to at least one of the ends of one of the rollers,
- the flange extending in a radial direction of the roller,
- the flange having a height above an outer surface of the roller, and
- a movement blocking arrangement structured and arranged to limit the gap between the rollers to a predetermined minimum gap, wherein the method comprises:
- positioning at least one scraper at an end of the roller with a flange such that a minimum roller surface distance between each scraper surface of the at least one scraper and the outer surface of the roller is less than or equal to the minimum gap.

The fourth aspect are generally associated with the same advantages as the first aspect. It is however emphasized that the method is applicable for, and suitable for applying on any roller crusher independent on dimensions. This implies that the method is applicable and suitable for applying on roller crushers of arbitrary roller dimensions, operated at arbitrary minimum gap settings and start-up gap settings.

According to an embodiment, the method further comprises positioning the at least one scraper at an end of the roller with a flange such that a minimum roller surface distance between each scraper surface of the at least one scraper and the outer surface of the roller is within the range of 70-100% of the minimum gap.

According to an embodiment of the fourth aspect, the method further comprises positioning the scraper such that a minimum flange distance between each scraping surface of the at least one scraper and an inner surface of the flange is 1-25 mm.

According to an embodiment of the fourth aspect, the method further comprises positioning the scraper such that a minimum flange distance between each scraping surface of the at least one scraper and an inner surface of the flange is at least 11 mm.

Preferably, the method further comprises positioning the scraper such that a minimum flange distance between each scraping surface of the at least one scraper and an inner surface of the flange is 15-20 mm.

According to an embodiment of the method, the movement blocking arrangement is structured and arranged to limit the gap between the rollers to a minimum gap of at least 45 mm.

Similarly, and correspondingly to the first aspect of the disclosure above, each of the second, third and fourth aspects of the disclosure will provide substantial advantages over prior art solutions.

Other objectives, features and advantages of the present disclosure will appear from the following detailed disclosure, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to “a/an/the [element, device, component, means, step, etc.]” are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The disclosure will be described in more detail with reference to the appended schematic drawings, which show an example of a presently preferred embodiment of the disclosure.

DETAILED DESCRIPTION

Figure 1:
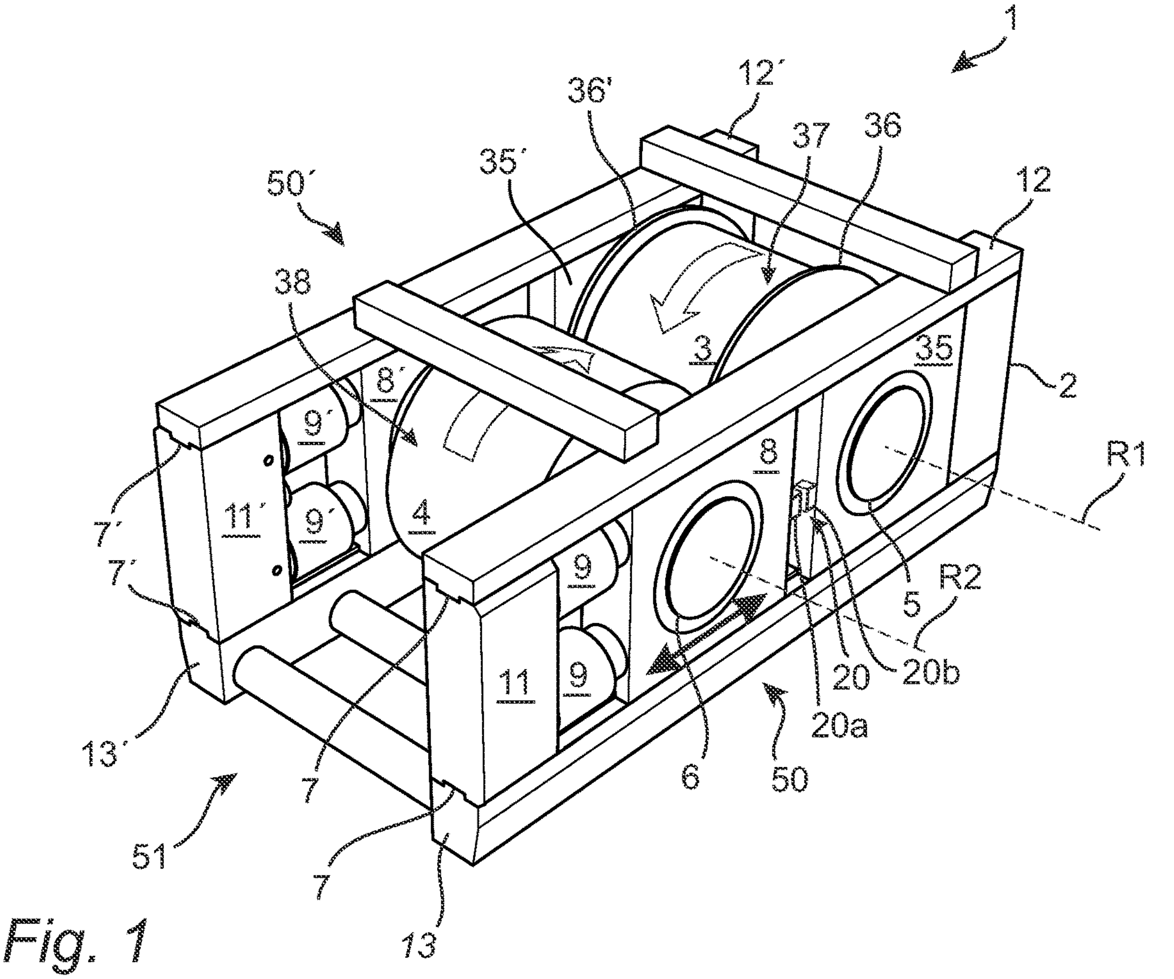
FIG. 1 is a perspective view of a roller crusher according to prior art.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

Figure 2A:
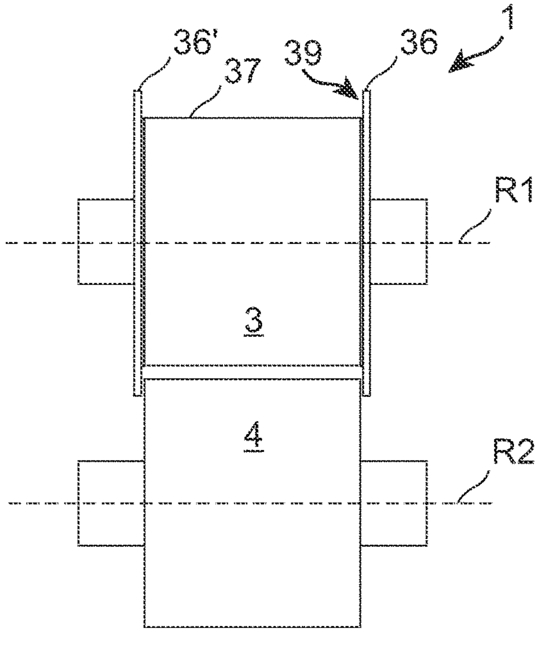
FIG. 2A is a schematic top view of two rollers of the roller crusher of FIG. 1.
Figure 2B:
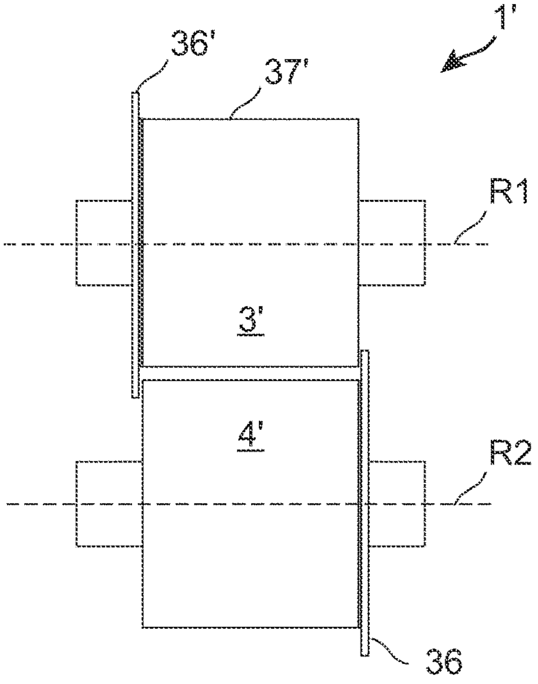
FIG. 2B is a schematic top view of two rollers of a roller crusher of the prior art according to an alternative embodiment.

As discussed in the background part of this disclosure, the arrangement of flanges to the ends of the crushing rollers (as shown in FIG. 2A and further discussed below), either one flange in each end of one of the grinding rollers (as shown in FIG. 2A and further discussed below), or one flange on each grinding roller (as shown in FIG. 2B and further discussed below), the crushing effect along the length of the grinding rollers are maintained. However, these flanges and also the edges of opposite crusher roller are under a lot of stress and wear during operation of the grinding roller due to accumulation of grinded material in the transition between the flange and an outer surface of the roller crusher. Prior art has suggested a scraper element for removing this accumulation of material, but an object of the present disclosure to proceed from there and ensure that flanges and edges of opposing roller crusher are subjected to less stress and wear and at the same time ensure effective removal of accumulation of material as well as economically acceptable time periods of operation of the roller crusher without need to adjust position or replace any scrapers within the roller crusher.

With reference to FIGS. 1, 2A, 2B, 9A, 9B, 9C, 10, 11, 12, 13A, 13B, 13C, this is achieved, in full or at least in part by a roller crusher 1 having two generally parallel rollers 3, 4, 3', 4' arranged to rotate in opposite directions, towards each other, and separated by a gap G, each roller having two ends. The roller crusher 1 further comprises a flange 36, 36' attached to at least one of the ends of one of the rollers 3, 4, 3', 4', which flange 36, 36' extends in a radial direction of the roller 3, 4, 3', 4' and has a height above an outer surface 37, 37' of the roller 3, 4, 3', 4'. The roller crusher further comprises at least one mechanical scraper 100, 100*a*, 100*b*, 100*t*, 900 and a remote material removal device 800 configured to output a material removing beam 820 towards a target area 822, wherein the at least one mechanical scraper 100, 100*a*, 100*b*, 100*t*, 900 and the remote material removal device 800 are arranged consecutive to each other at an end of the roller 3, 4, 3', 4' with a flange 36, 36' for at least partially removing material accumulated on the flange 36, 36' and/or on the outer surface 37, 37' at the end of the roller 3, 4, 3', 4'.

With reference to FIGS. 1, 2A, 2B, 9A, 9B, 9C, 10, 11, 12, 13A, 13B, 13C, this is also achieved, in full or at least in part, by a roller crusher 1 having two generally parallel rollers 3, 4, 3', 4' arranged to rotate in opposite directions, towards each other, and separated by a gap G, each roller having two ends. The roller crusher 1 further comprises a flange 36, 36' attached to at least one of the ends of one of the rollers 3, 4, 3', 4', which flange 36, 36' extends in a radial direction of the roller 3, 4, 3', 4' and has a height above an outer surface 37, 37' of the roller 3, 4, 3', 4'. The roller crusher further comprises at least one mechanical scraper 100, 100*a*, 100*b*, 100*t*, 900 and a remote material removal device 800 configured to transmit a material removing beam 820 towards a target area 822, wherein the at least one mechanical scraper 100, 100*a*, 100*b*, 100*t*, 900 and the remote material removal device 800 are arranged consecutive to each other at an end of the roller 3, 4, 3', 4' with a flange 36, 36'. The disclosed method comprises at least the steps of: a) at least partially removing material accumulated on the flange 36, 36' and/or on the outer surface 37, 37' at the end of the roller 3, 4, 3', 4' by means of the at least one mechanical scraper 100, 100*a*, 100*b*, 100*t*, 900; and b) at least partially removing material accumulated on the flange 36, 36' and/or on the outer surface 37, 37' at the end of the roller 3, 4, 3', 4' by means of the remote material removal device 800, wherein step a) is performed continuously and wherein step b) is performed at least intermittently.

The arrangement of at least one mechanical scraper 100, 100*a*, 100*b*, 100*t*, 900 and a remote material removal device 800 arranged consecutive to each other give rise to a number of advantages. Firstly, it provides a more reliable system for keeping the build-up material at the flange 36, 36' within acceptable levels with a continuous scraping operation by the mechanical scraper 100, 100*a*, 100*b*, 100*t*, 900, while the remote material removal device 800 may be used at least intermittently to remove, in part or in full, the material build-up located in the transition between the flange 36, 36' and the outer surface 37, 37' at the end of the roller 3, 4, 3', 4' to thereby increase the wear life of the mechanical scraper 100, 100*a*, 100*b*, 100*t*, 900. This arrangement also provides a more flexible and controllable system for removing built-up material. Such control may for example be initiating remote material removal at consecutive time periods, which time periods either is based on the conditions of the material to be crushed, humidity, temperature, etc., thus pre-set time periods. However, such time periods may also be based on a feedback control system 80, which will be disclosed in more detail below. As readily appreciated by the person skilled in the art, the combination of at least one mechanical scraper and a remote material removal device will act in synergy due to their different strengths and weaknesses.

FIG. 1 shows a roller crusher 1 according to the prior art. Such roller crusher 1 comprises a frame 2 in which a first, fixed crusher roller 3 is arranged in bearings 5, 5'. The bearing housings 35, 35' of these bearings 5, 5' are fixedly attached to the frame 2 and are thus immoveable. A second crusher roller 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rollers 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. Further, a number of hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as these are adjusting the gap width and reacting to forces occurring at the crusher rollers due to material fed to the roller crusher 1.

Such roller crushers work according to a technique called interparticle crushing. The crushing rollers 3, 4 rotates counter to each other as illustrated schematically in FIG. 1 using the arrows. The gap between the crushing rollers 3, 4 is adjusted by the interaction of feed load and the hydraulic system effecting the position of the second crusher roller 4. As shown in FIG. 1 and also in FIG. 2A which shows the rollers 3, 4 from above, one of the grinding rollers 3 further comprises flanges 36, 36' arranged at opposite ends of the grinding roller 3, wherein each flange 36, 36' has an outer edge that extends a height H (see FIG. 3A) radially past the outer surface 37 of the roller body of the grinding roller 3, and positioned axially outward of the roller body of the opposite grinding roller 4.

Another prior art roller crusher is disclosed in e.g. WO2013/156968, in which each of the grinding rollers with bearings is arranged in interconnected arch-shaped frame sections, wherein each interconnected arch shaped frame sections are pivotably connected to a base frame. The disclosed subject matter within this disclosure is equally applicable in such a prior art roller crusher arrangement.

Figure 3A:
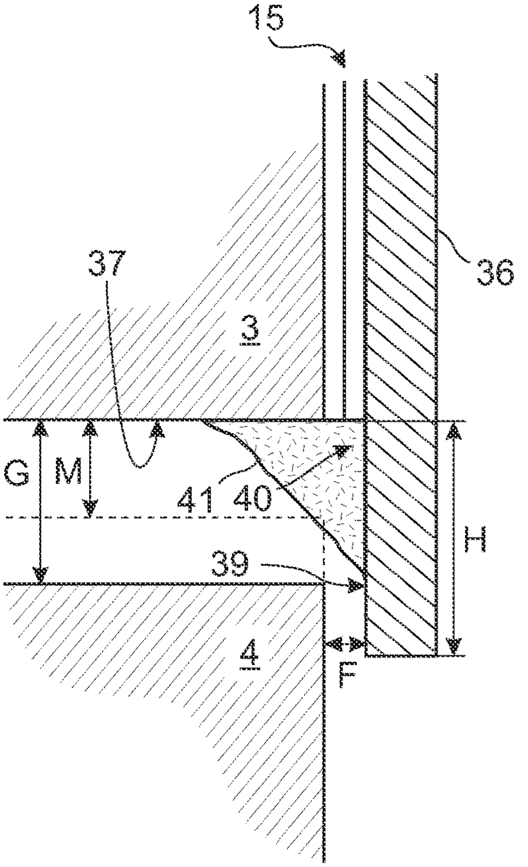
FIG. 3A is a top cross-sectional view of segments of a roller crusher according to the prior art.

As also illustrated in FIG. 3A, each flange 36 is arranged on an end of the roller 3 such that an inner surface 39 of the flange 36 is located at a distance F from the end of the opposing roller 4. The distance F is necessary to avoid contact between the flange 36 and roller 4 which could lead to material damage. At the same time, the distance F should not be too large, as that increases the risk of material leaving the roller crusher through the gap thus formed. The distance F may be realized by mounting the flange 36 to the roller 3 via shims 15, best illustrated in FIG. 3A. The purpose of the flanges 36, 36' is to prevent material from exiting the gap at the end thereof, thereby forcing all material that enters the roller crusher to pass through the crushing gap to be crushed. An alternative embodiment of a roller crusher with flanges is illustrated in FIG. 2B. The only difference between the two embodiments is that the roller crusher in FIG. 2B has flange 36 disposed on the second grind roller 4' instead of the first grind roller 3', which means that each of the grinding rollers 3', 4' has one flange 36, 36' each. As readily appreciated by the person skilled in the art, the technical effect of preventing material to exit the crusher 1, 1' at the ends of the gap will be equally well achieved for both disclosed embodiments. Importantly, the disclosed inventive concept is equally applicable to both these embodiments.

As previously mentioned, the gap between the rollers 3, 4 can be adjusted. For crushing operation, the roller crusher 1 is preset to have a specific distance between the rollers, the so-called start-up gap G. This is illustrated in FIG. 3A. The start-up gap G is selected based on several different factors, such as the roller crusher size (i.e. grinding roller diameter), the desired properties of crushed material etc. The start-up gap G may be in the range 10 to 140 mm. However, typically, the start-up gap G is within the range 60 to 90 mm.

The roller crusher further comprises a movement blocking arrangement 20 structured and arranged to limit the gap between the rollers to a minimum gap M. There are many different ways to provide such a movement blocking arrangement known in the art, and it is therefore not discussed in detail herein. One common solution, which is the solution illustrated in FIG. 1, is to provide a pair of mechanical engagement elements 20*a*, 20*b* on the bearing houses 35, 35'. The minimum gap M may be relatively small for some roller crushers and/or materials to be crushed, such as in the range 10 to 30 mm. However, typically, the minimum gap M is at least 45 mm. It is however conceivable that the minimum gap is larger, such as e.g. at least 55 mm, or at least 60 mm or at least 65 mm or at least 70 mm.

As initially described, a problem with this type of grinding assemblies is that material tend to build up at the corner 40 (see FIG. 3A) between the outer surface 37 of the grinding roller 3 and the inner surface 39 of the flange 36, 36'. Such material build-up 41 is schematically illustrated in FIG. 3A for the roller crusher 1 of FIGS. 1 and 2A, and is generally unwanted as it generates increased local loads in this area during operation, which may cause wear, damage and/or deformation on the opposite grinding roller 4 which does not have a flange. To provide a solution to this problem, means for removing at least a part of this build-up material 41 is provided. The current disclosure relates to two different such means, mechanical scrapers and a remote material removal device. The mechanical scrapers will be discussed first with reference to FIGS. 2 to 8, and the remote material removal device will then be discussed with reference to FIGS. 9 to 12.

Figure 3B:
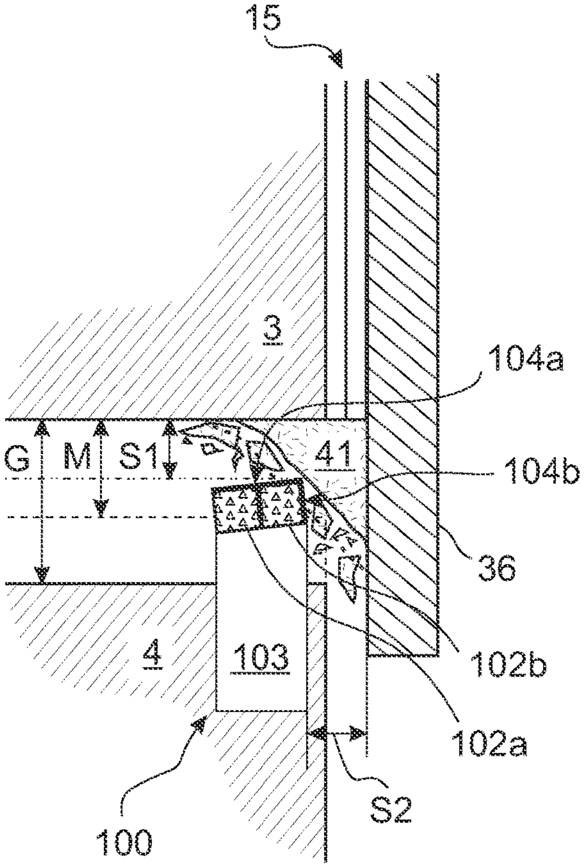
FIG. 3B is a top cross-sectional view of segments of a roller crusher according to an embodiment of the disclosure.
Figure 3C:
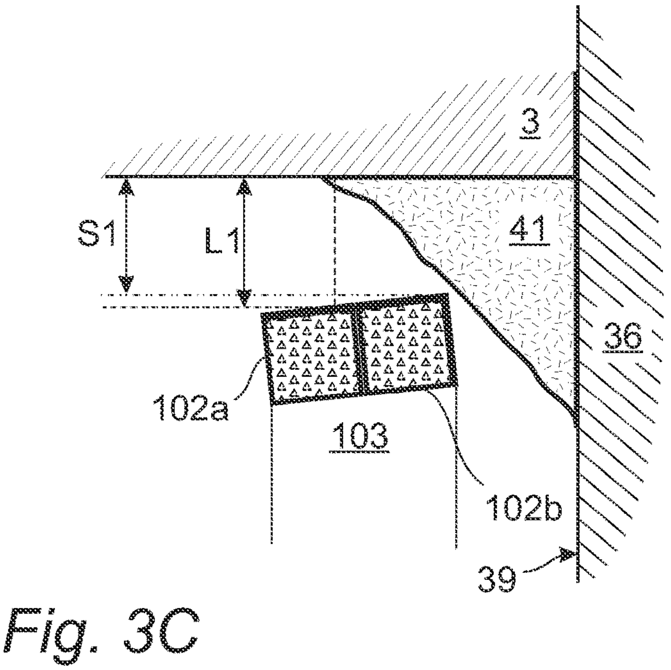
FIG. 3C is an enlarged view of parts of FIG. 3B highlighting the position of the scraper surfaces relative to the roller surface.

FIG. 3B illustrates a mechanical scraper 100 according to an embodiment of the disclosure. The mechanical scraper 100 is attached to the roller crusher, e.g. in the frame or other supporting feature, but is here illustrated in isolation with respect to the crusher rollers to enhance clarity. The mechanical scraper 100 comprises two wear members 102*a*, 102*b* disposed at an end of the scraper 100 so as to define a scraping surface 104*a* generally facing the roller 3, and a scraping surface 104*b* generally facing an inner surface 39 of the flange 36. The wear members 102*a*, 102*b* are attached to scraper main body 103. As illustrated in FIG. 3C, which shows parts of FIG. 3B enlarged, the wear members 102*a*, 102*b* may be arranged on the scraper main body 103 such that a distance L1 between the outer surface 37 of the roller 3 and the scraping surface 104*a* decreases towards the flange 37. This allows for material to more easily be transported away from the corner 40 between the inner surface 39 of the flange 36 and the outer surface 37 of the roller 3 once scraped off, thus contributing to an efficient material removal process.

The nature of the material build-up 41 and the speed at which the at least one mechanical scraper 100 and the material build-up 41 meets, tend to make material removal substantially impact-driven. Hence, instead of the scraper with time creating a carved recess in the build-up material, large surface portions of the material build-up 41 are more or less instantaneously broken off when encountering the scraper. This is schematically illustrated in FIG. 3B. The remaining portion of the material build-up 41 has been found to present a relatively uniform outer surface. It is not necessary to remove the material build-up 41 completely. Preferably, only parts of the build-up 41 should be removed. The partial removal of the material build-up 41 will reduce overall wear of the scraper 100 as it is exposed to a significantly less degree of wear when positioned further away from the roller surface 37. It has been realized that a preferred position of the scraper 100 may be when the scraper 100 is positioned such that a minimum roller surface distance S1 between each scraping surface 104*a*, 104*b* of the at least one scraper 100 and the outer surface 37 of the roller 3 is at least 70% of the minimum gap M. The minimum roller surface distance S1 is defined in FIG. 3B. At this position, the roller crusher 1 may be in operation for economically acceptable time periods before the scraper 100 has been worn down to an extent at which the distance between the scraper 100 and the outer surface 37 of the roller 3 will become close to the minimum gap M, and the scraper 100 has to be either adjusted in position or replaced. As illustrated in FIG. 3B, the scraper 100 is positioned at a minimum flange distance S2 from the inner surface of the flange 26. As can be seen in FIGS. 3A and B, this minimum flange distance S2 is larger than the distance F between the roller 4 and the inner surface 39 of the flange 36. This may appear somewhat surprising, as it can be expected that the scraper 100 may miss removing material necessary to be removed in order to completely avoid contact between roller 4 and the material build-up 41. However, positioning the scraper 100 closer to the flange 36 is associated with other disadvantages. Firstly, it increases the risk of the scraper 100 being damaged by the flange 36 and/or material build-up 41 on the flange 36, a risk that increases with decreasing distance to any moving surface. Secondly, it increases the risk of damaging the flange 36 itself. By positioning the scraper 100 at a minimum flange distance S2 being larger than the distance F, a reasonable trade-off is obtained. A sufficient amount of material is removed from the build-up material 41 at the flange 36, while keeping the scraper 100 at a safe distance from the flange, which results in a prolonged scraper life as well as flange life. Preferably, the scraper 100 is positioned such that a minimum flange distance S2 between each scraping surface 104*a*, 104*b* of the at least one scraper 100 and an inner surface 39 of the flange 36 is 1-25 mm. More preferably, the scraper 100 is positioned such that a minimum flange distance S2 between each scraping surface 104*a*, 104*b* of the at least one scraper 100 and an inner surface 39 of the flange 36 is at least 11 mm. The risk of flange damage has been found to be significantly reduced at this distance. Needless to say, flange bending is unwanted as it will allow material to slip out from the crusher gap at the sides, hence leading to parts of the material bypassing the roller crusher, with an end result that the material output from the roller crusher will not have the specified size distribution.

The scraper 100 is only schematically illustrated in FIG. 3B to allow defining the preferred position of the scraper 100 in relation to the roller crusher 1, or more specifically, in relation to the roller surface 37 and/or flange 36. Turning instead to FIGS. 4 to 8, it will be described in detail how scrapers, such as the scraper 100 of FIG. 3B, may be used in combination on a roller crusher.

FIGS. 4A to D illustrates four different example embodiments of a scraper assembly for a roller crusher. For each scraper included in these assemblies, the preferred positioning described hereinabove with reference to scraper 100 in FIG. 3B may apply. When describing the example embodiments, focus will instead be put on the differences between the individual scrapers with regards to positioning as well as other properties.

Figure 4A:
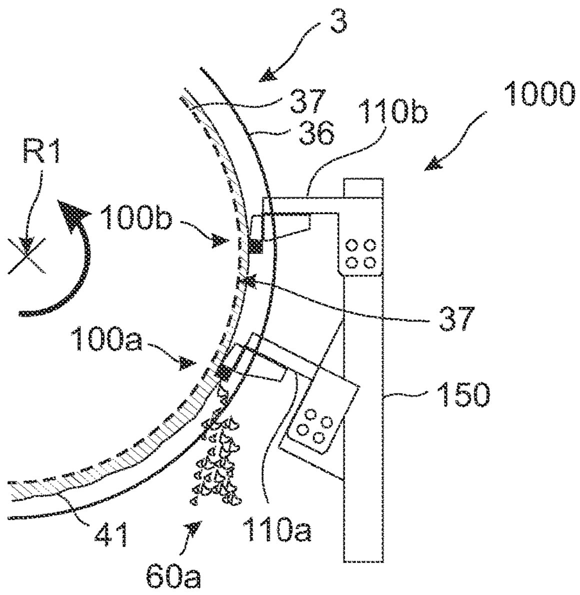
FIG. 4A is a part-sectional side view of a roller crusher according to an embodiment of the disclosure.

FIG. 4A illustrates a scraper assembly 1000 according to a first example embodiment. The scraper assembly 1000 consists of two scrapers 100*a*, 100*b* arranged consecutively to each other at an end of the roller 3 with flange 36. The scrapers 100*a*, 100*b* are positioned in relation to the roller 3 such that each scraping surface 104*a*, 104*b* of the scraper is located at the same or substantially the same minimum distance from the roller surface 37 (in other words: the same minimum roller surface distance S1, see FIG. 3B). Furthermore, the scrapers 100*a*, 100*b* are positioned such that each scraping surface 104*a*, 104*b* of the scraper is located at the same or substantially the same minimum distance from the flange 36 (in other words: the same minimum flange distance S2, see FIG. 3B). Thus, for the scraper assembly 1000, the front scraper, i.e. scraper 100*a*, will, at least the first time period after installation of the scraper assembly 100, be the only scraper actually performing any material removal. This is illustrated in FIG. 4A by only the front scraper 100*a* removing material 60*a*. Scraper 100*b* will act as a pure backup scraper, in case the front scraper 100*a* fails. This is advantageous as it prolongs the time period of operation before the crusher has to be shut down for replacement.

With time in operation, the wear elements 102*a*, 102*b* of front scraper 100*a* will gradually be worn, thus effectively moving scraping surfaces 104*a*, 104*b* away from the roller surface 37 and/or inner surface 39 of the flange 36. This wear process will lead to increasingly more material of the material build-up 41 not being removed by the first scraper

100*a*, resulting in an increasing thickness of the material build-up 41 advancing towards the second scraper 100*b*. Since the second scraper 100*b* was initially positioned in the same relative position with respect to the roller surface 37 and flange 36 as the front scraper 100*a*, it has thus far been protected from wear by the front scraper 100*a*. This means that the second scraper 100*b* will at this time still maintain its original minimum distance to the roller surface 37. Consequently, the second scraper 100*b* is now available to remove the excess material that the worn front scraper 100*a* is not any more able to remove. This way, the second scraper 100*b* will, with wear, become increasingly more important to overall material removal of the scraper assembly 100. The scraper 100*b* thus starts of in the role as a pure backup scraper, and end in the role of a scraper in operation. The front 100*a* and second 100*b* scraper may each be mounted on a respective holding fixture 110*a*, 110*b* which, in turn, may be mounted onto support structure 150, which may be a part of the frame of the roller crusher, or a bracket or supporting element attached to that frame. The holding fixtures will be described in more detail later with reference to FIG. 5.

Figure 4B:
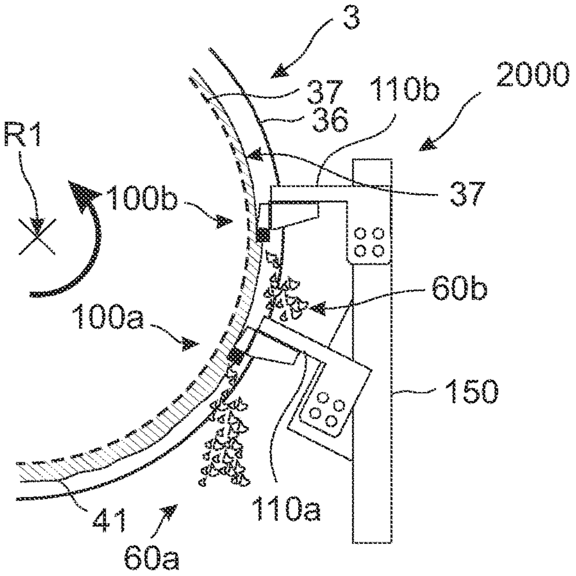
FIG. 4B is a part-sectional side view of a roller crusher according to another embodiment of the disclosure.

FIG. 4B illustrates a scraper assembly 2000 according to a second example embodiment. The scraper assembly 2000 differs from the first embodiment 100 only in so far as scrapers 100*a* and 100*b* arranged at different minimum distances from the roller surface 37 (in other words: they have different minimum roller surface distances S1), with the minimum roller surface distance S1 being smaller for second scraper 100*b* than for front scraper 100*a*. As readily appreciated by the person skilled in the art, this means that both the front scraper 100*a* and the second scraper 100*b* will remove material already from start in the first period of operation. This is illustrated in FIG. 4B by only the front scraper 100*a* removing material 60*a* and the second scraper 100*b* removing material 60*b*. Consequently, the second example embodiment will share the technical effects that the first example embodiment presents after the first time period. The front scraper 100*a* and second scraper 100*b* are preferably positions to have the same or substantially the same minimum distance from the inner surface of the flange (i.e. as for the first example embodiment). However, it is also conceivable that the second scraper 100*b* is positioned such that a minimum distance between a scraper surface 104*a*, 104*b* and the inner surface 39 of the flange 37 is larger for the front scraper 100*a* than for the second scraper 100*b* (i.e. the minimum flange distance S2 is larger for the front scraper 100*a* than for the second scraper 100*b*). As readily appreciated by the person skilled in the art, such a relative positioning provides a similar technical effect as already described for the different minimum roller surface distances S1.

Figure 4C:
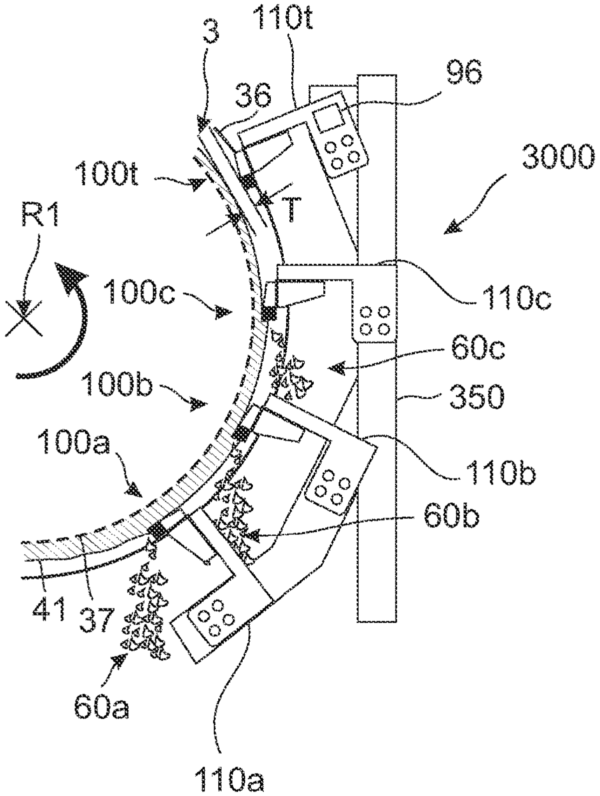
FIG. 4C is a part-sectional side view of a roller crusher according to another embodiment of the disclosure.

FIG. 4C illustrates a scraper assembly 3000 according to a third example embodiment. The scraper assembly 3000 differs from the second example embodiment only in so far as scrapers 100*a* and 100*b* are followed by yet another consecutively arranged scraper, third scraper 100*c* directly followed by a trigger scraper 100*t*. As illustrated in FIG. 4C, the first three scrapers 100*a-c* are arranged at different minimum distances from the roller surface 37 (in other words: they have different minimum roller surface distances S1), with the minimum roller surface distance S1 gradually decreasing for every consecutive scraper in the line of scrapers starting with front scraper 100*a*. As readily appreciated by the person skilled in the art, this means that all three scrapers 100*a-c* will remove material already from the start of operation. This is illustrated in FIG. 4C by the front scraper 100*a* removing material 60*a*, the second scraper 100*b* removing material 60*b*, and the third scraper 100*c* removing material 60*c*. The trigger scraper 100*t* is arranged at the very end of the line of consecutive scrapers and is therefore acting as a rear scraper. The trigger scraper 100*t* is arranged at a maximum tolerable distance T from the roller surface 37 and is configured to provide a trigger signal in response to contacting the material build-up 41. In the example embodiment, this is achieved by means of a strain gauge 96 mounted onto the holding fixture 110*t*. Therefore, during normal operation of the roller crusher, the trigger scraper 100*t* is not in contact with the material build-up 41. However, with time, the scrapers 100*a-c* will gradually wear and as a result the material build-up 41 will gradually become thicker and thicker. As the build-up material 41 has reached the maximum tolerable distance T, it will make contact with the trigger scraper 100*t*. This will create mechanical strain in the holding fixture 110*t*, which will be reflected in the signal output from the strain gauge 96. Monitoring this signal allows for determining when the "acting scrapers", i.e. scraper 100*a-c* have all served their time and are in need of replacement. Thus, a trigger signal from the strain gauge 96 can be used to determine when the machine must be shut down for scraper replacement. Although preferably not intended to, trigger scraper 100*t* is still a scraper on its own. This means that if the roller crusher would be operated some time after trigger scraper 100*t* first induced a signal for crusher shut down, trigger scraper 100*t* will provide the scraping. Thus, the trigger scraper 100*t* is more than just a sensor—it is also an extra backup scraper. To prevent rolls and/or flange damage, the maximum tolerable distance T may be chosen such that the roller crusher can be operated some time also after scraping with the trigger scraper 100*t* has commenced. The term "trigger scraper" should not be construed as meaning a special kind of scraper per se. The scraper 100*t* may be identical to any other scraper disclosed herein, such as scraper 100*a, b* and *c*. The term is instead used to identify a specific scraper among the at least one scraper which specific scraper is configured to act as a sensing means to provide information pertaining the material build-up 41. This may be accomplished in different ways as long as mechanical interaction between the build-up material and the trigger scraper is converted to an output signal.

Figure 4D:
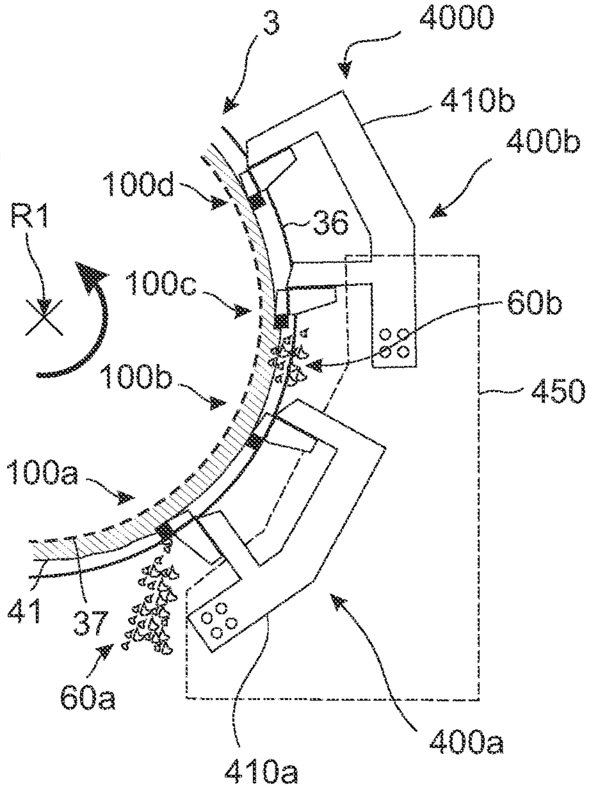
FIG. 4D is a part-sectional side view of a roller crusher according to another embodiment of the disclosure.

FIG. 4D illustrates a scraper assembly 4000 according to a fourth example embodiment. The scraper assembly 4000 differs from the second example embodiment in so far as scrapers 100*a* and 100*b* are here mounted on one common holding fixture 410*a* which together with the scrapers 100*a* and 100*b* form a first subset 400*a* of scrapers and that the scraper assembly 4000 further comprises a second subset 400*b* of scrapers comprising scrapers 100*c* and 100*d*, which second subset 400*b* is consecutively arranged with the first subset 400*a*. Each common holding fixture 410*a*, 410*b* may be mounted onto support structure 450, which may be a part of the frame of the roller crusher, or a bracket or supporting element attached to that frame. As can be seen in FIG. 4D, the pair of scrapers of a subset are arranged at equal minimum distance S1 from the roller surface. However, the minimum distance S1 for the first subset 400*a* is larger than the minimum distance S1 for the second subset 400*b*. As readily appreciated by the person skilled in the art, during the first time period or crushing operation, the first scraper 100*a* of subset 400*a* and the first scraper 100*c* of subset 400*b* will perform material removal in the same manner as previously described for the scraper assembly 2000 of the second example embodiment. However, a difference between the fourth and second example embodiments is that the fourth example embodiment will provide backup scrapers in the form of a second-in-line scraper in each subset (i.e. scraper 100*b* for the first subset 400*a*, and scraper 100*d* for the second subset 400*b*). As the scrapers 100*a* and 100*c* have become worn, the scrapers 100*b* and 100*d* will gradually enter into operation. Thus, the fourth example embodiment provides both a backup and a shared scraping. Another difference between the fourth example embodiment and the previously described example embodiments is that each subset of scrapers 400*a*, 400*b* constitutes its own unit. Specifically, front scraper 100*a* and second scraper 100*b* of the first subset of scrapers 400*a* may be mounted on a common fixture 410*a* and scrapers 100*c* and 100*d* of the second subset 400*b* of scrapers may be mounted onto common holding fixture 410*b*. The significance of the common holding fixture versus the single holding fixtures of the previous example embodiments will be described in what follows.

The four example embodiments described hereinabove constitute different combinations or permutations of single inventive aspects, such as the use of two or more scrapers, the use of backup scrapers, the use of scrapers together sharing scraping operation etc. The person skilled in the art realizes that many other combinations of these inventive aspects are possible. For example, a trigger scraper may be added to any one of the other example embodiments or any other example embodiment within the scope of protection of the claims. As another nonlimiting example, two or more scrapers may be arranged with equal minimum distance to the roller surface (minimum roller surface distance S1) but varying minimum distance to the flange (minimum flange distance S2). Scrapers may also be positioned at different angular positions with respect to the rotational axis of the roller 3. It is conceivable to locate scrapers at basically any angular position along the roller except at the gap. However, preferably the scrapers are arranged at a lower part of the roller crusher. This implies that the scrapers are arranged below a horizontal plane which intersects the rotational axes R1, R2 of the two rollers 3,4. Even more preferably, the scrapers are arranged such that scraping surfaces of the scrapers at least partly face downwards for allowing removed material to leave from the roller and scraping surfaces by gravitational force. Preferably, the scrapers are arranged at about 6 to 9 o'clock, 7-9 o'clock or 7-8 o'clock of the roller 3, when viewing the roller 3 from a side showing clockwise rotation.

Figure 5A:
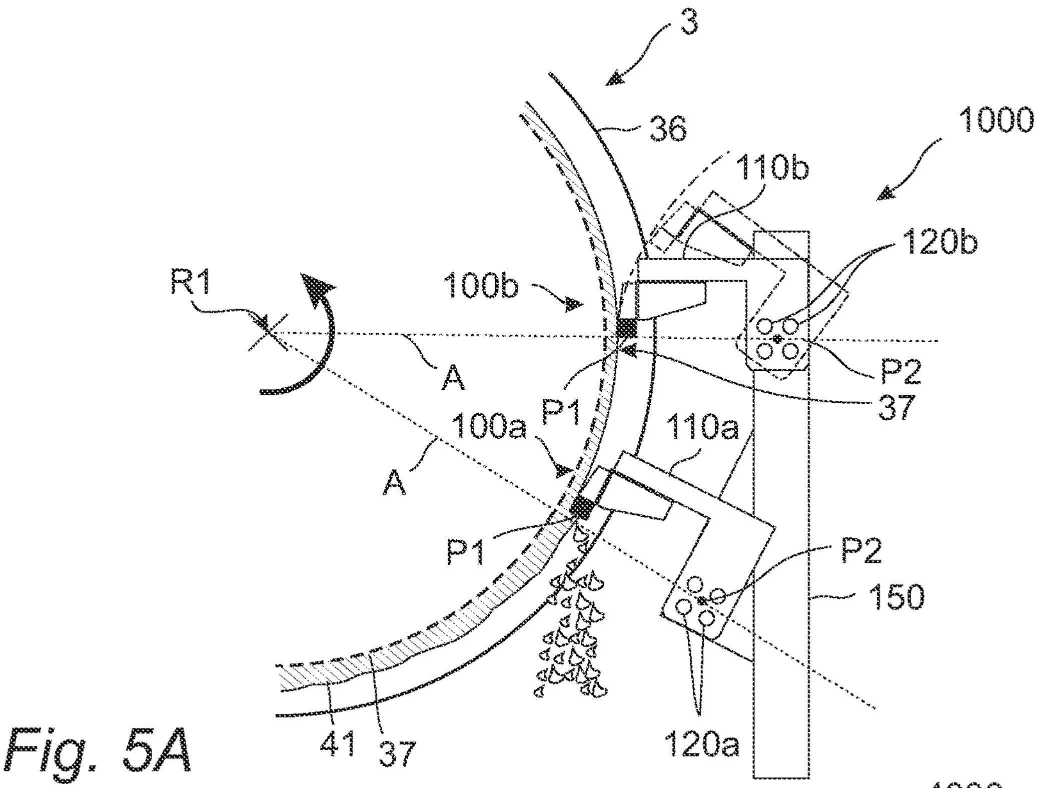
FIG. 5A is a part-sectional side view illustrating relative dimensions of scrapers of the roller crusher of FIG. 4A.

The holding fixtures for the scrapers will now be described in detail with reference to FIGS. 5A and B. FIG. 5A illustrates the scraper assembly 1000 illustrated in FIG. 4A. Each scraper 100*a*, 100*b* may be attached to a respective holding fixture 110*a*, 110*b* which in turn may be attached to a support structure 150 at a fastening position P2 located at a distance from the outer surface 37 of the roller 3 by means of fasteners 120*a*, 120*b*. As illustrated in FIG. 4A, the holding fixture 110*a*, 110*b* is shaped in a particular way. In particular, each scraper 100*a*, 100*b* is arranged in relation to the roller crusher 1 such that a position P1 of each scraping surface 104*a*, 104*b* of the scraper 100*a*, 100*b* is located at, or consecutive to, a radial axis A which extends from a rotational axis R1 of the roller 3 and through the respective fastening position P2. By this provision, it is ensured that any unintentional movement of the scraper 100*a*, 100*b* due to e.g. strong impact forces arising through the interaction with the built-up material 41 will force the scraper to move away from the roller surface 37. This is indicated for scraper 100*b* in FIG. 5A by the dashed lines illustrating how a broken-off holding fixture 110*b* and its scraper 100*b* would pivot clockwise, hence outwardly around its fastening position P2, after having been exposed to a strong impact force. This process implies that fasteners 120*b* break at fastening position P2. This represents one conceivable way of achieving the preferred effect, namely to intentionally design a weak-spot at the fastening position P2. It is not necessary for the holding fixture to be fixedly attached at the fastening position. It is equally well conceivable that the holding fixture is pivotable attached at the fastening position P2. To ensure that the scraper 100*a*, 100*b* is kept in their intended position during operation, such pivotably arranged scrapers may be mechanically locked into said intended positions by means of a locking system such as a gear, cam or the like. One example of this will be given in what follows.

Figure 5B:
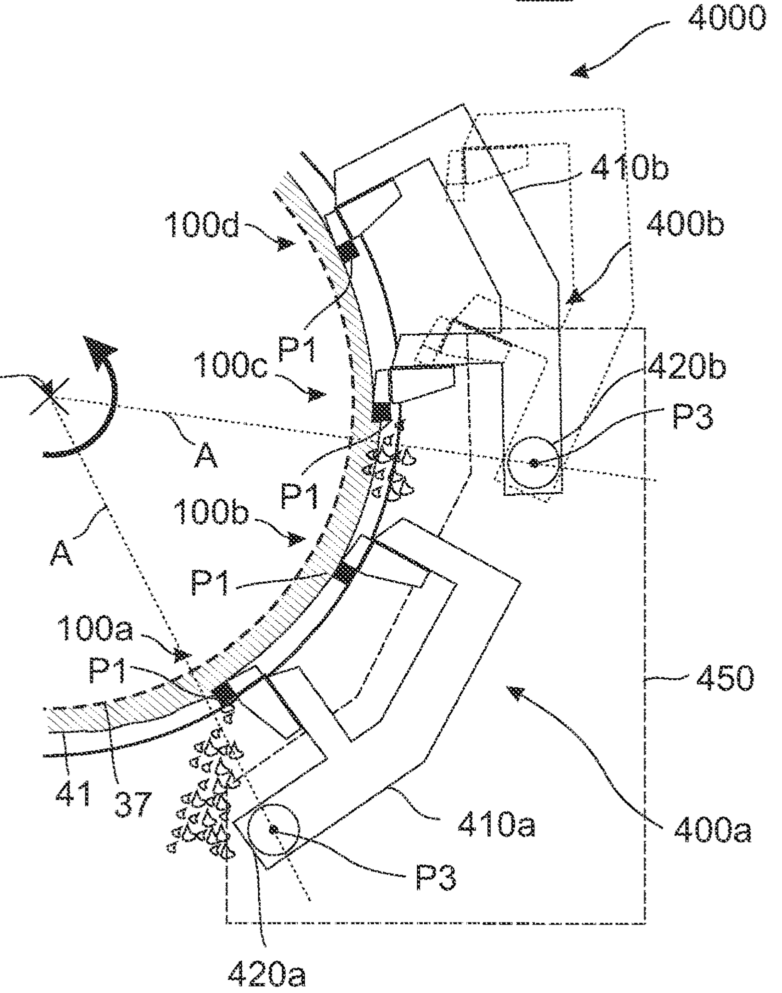
FIG. 5B is a part-sectional side view illustrating relative dimensions of scrapers of the roller crusher of FIG. 4D.

FIG. 5B illustrates the scraper assembly 4000 illustrated in FIG. 4D. As previously described, scrapers 100*a* and 100*b* may here be mounted on common holding fixture 410*a* which together with the scrapers 100*a* and 100*b* form a first subset 400*a* of scrapers. In the same manner, scrapers 100*c* and 100*d* may be mounted on common holding fixture 410*b* which together with the scrapers 100*c* and 100*d* form a second subset 400*b* of scrapers. Each common holding fixture 410*a*, 410*b* may be attached to support structure 450 at a respective fastening position P3. The fastening for this embodiment is however different than for the scraper assembly 3000. Instead of being fastened rigidly by means of fasteners 120*a*, 120*b*, the holding fixtures 410*a*, 410*b* are instead pivotably fastened and biased towards a working position. This is achieved by means of fasteners 420*a* and 420*b* respectively. The bias should be in the magnitude to keep the scrapers 100*a-d* in working position up to a predetermined threshold force. Again, such a predetermined threshold force is set to ensure that the flanges and/or the outer surface at the end of the roller do not risk of becoming damaged by a collision between a scraper and the non-removable material. Biasing could be achieved by means of a spring. It is also conceivable to use an unbiased pivotable fastening combined with a torque-limiter. For such an embodiment, the holding fixture would be seemingly rigidly attached to the roller crusher until the scrapers have been exposed to a force exceeding a certain threshold force at which the torque limiter is activated and the holding fixture is allowed to swingably move the scrapers away from the roller surface. The toque-limiter may be combined with biasing means, such as a spring.

Discussing the second subset 400*b*, since more than one scraper is attached to the same common holding fixture, that holding fixture must preferably be designed such that a position P1 of each scraping surface of the two scrapers 100*a*, 100*b* is located at, or consecutive to, a radial axis A which extends from a rotational axis R1 of the roller and through the common fastening position R3. This implies that it must be ensured that scraper surfaces of both scraper 100*a* and scraper 100*b* is located at, or consecutive to, the radial axis A. This will ensure that any unintentional movement of the scraper 100*a*, 100*b* due to e.g. strong impact forces arising through the interaction with the built-up material 41 will force the scraper to move away from the roller surface 37. This is indicated for the second subset 400*b* of scrapers in FIG. 5B by the dashed lines illustrating how a broken-off first subset 400*b* of scrapers would pivot clockwise around its respective common fastening position P3, and hence outwardly, after having been exposed to a strong impact force.

Figure 6:
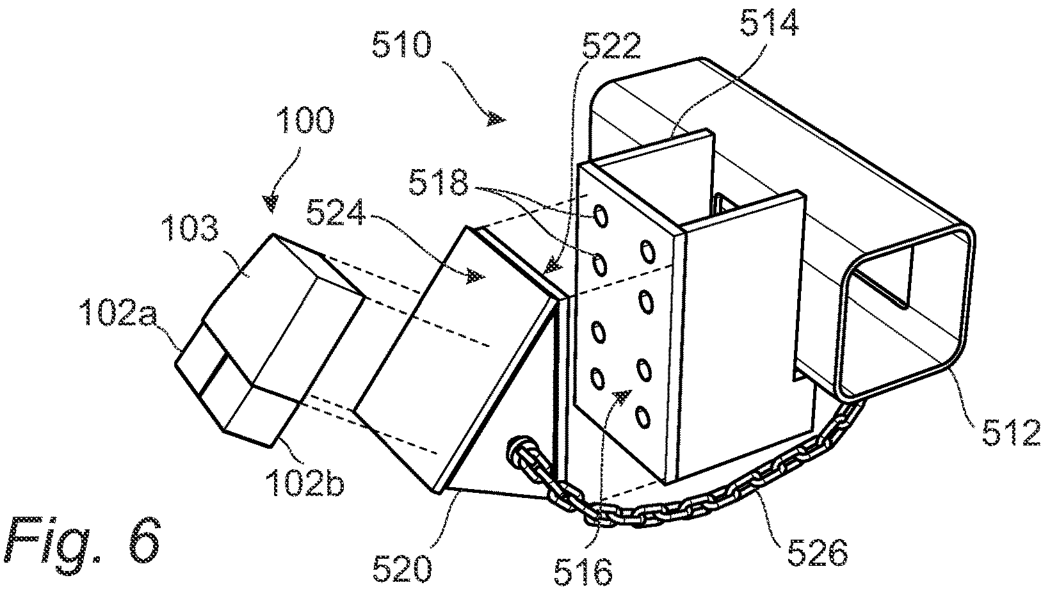
FIG. 6 is a perspective view of a scraper and a holding fixture for mounting the scraper on a roller crusher according to one embodiment of the disclosure.

FIG. 6 illustrates already described scraper 100 together with a holding fixture 510 according to another example embodiment. The holding fixture 510 may comprise a square beam 512 structured and arranged to be attachable to a support structure of the roller crusher. Attached to the square beam 512 is bracket 514 which presents an attachment surface 516 with through-holes 518. The scraper 100 is attachable to the bracket 518 via wedge element 520. Wedge element 520 has a first surface 522 configured to be attachable to the attachment surface 516 by fasteners, such as e.g. bolts and screws, and a second surface 524 at which the main body 103 of scraper 100 is attached e.g. by welding. Chain 526 interconnects wedge element 520 with square beam 512 and acts as an extra security measure. In case a sudden impact force would break the attachment between wedge element 520 and bracket 514, the chain 526 will prevent the scraper 100 and wedge element 520 from falling into the material output section of the roller crusher (not shown). This is advantageous as it may prevent damage to underlying structures, such as e.g. conveyor belts, screens, and surfaces of chutes etc.

Figure 7:
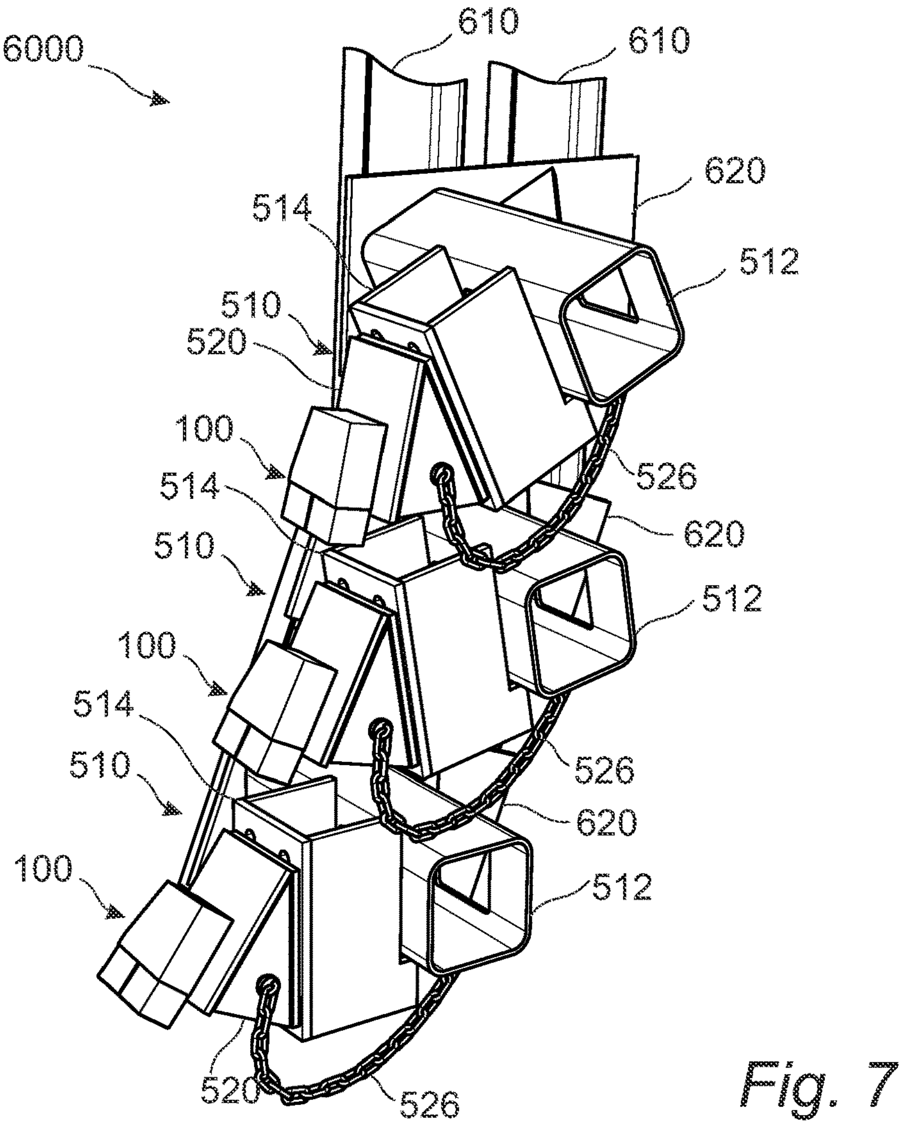
FIG. 7 is a perspective view of three scrapers and their associated fixtures of FIG. 6 mounted consecutively to each other on a roller with a flange of a roller crusher according to an embodiment of the disclosure.

FIG. 7 illustrates a scraper assembly 6000 consisting of three scrapers 100 mounted on respective holding fixtures 510 already described with reference to FIG. 6. The three scrapers 100 are here arranged consecutively to each other and the scraper assembly 6000 is intended to be arranged along a roller with a flange in the same manner as previously described with reference to FIGS. 4A to D for at least partially removing material accumulated on the flange and/or on the outer surface at the end of the roller. Each holding fixture 510 is mounted onto the roller crusher via a respective plate 620 which may be attached to frame elements 610. The position of each scraper 100 is adjusted during installment by carefully adjusting the plate 620 prior to attaching the same to the frame elements 620. The relative position between each scraper and the roller surface and/or flange can be selected in many different ways following what has been outlined before with reference to FIGS. 4A to D. Thus, it is conceivable that the scrapers 100 of scraper assembly 6000 has an equal minimum roller surface distance S1 to the roller surface 37 but may alternatively have different minimum roller surface distances S1 to the roller surface 37. In the same manner, it is conceivable that scrapers 100 of the scraper assembly 6000 has an equal minimum flange distance S2 to the inner surface 39 of the flange 36 but may alternatively have different minimum flange distances S2 to the inner surface of the flange.

Figure 8:
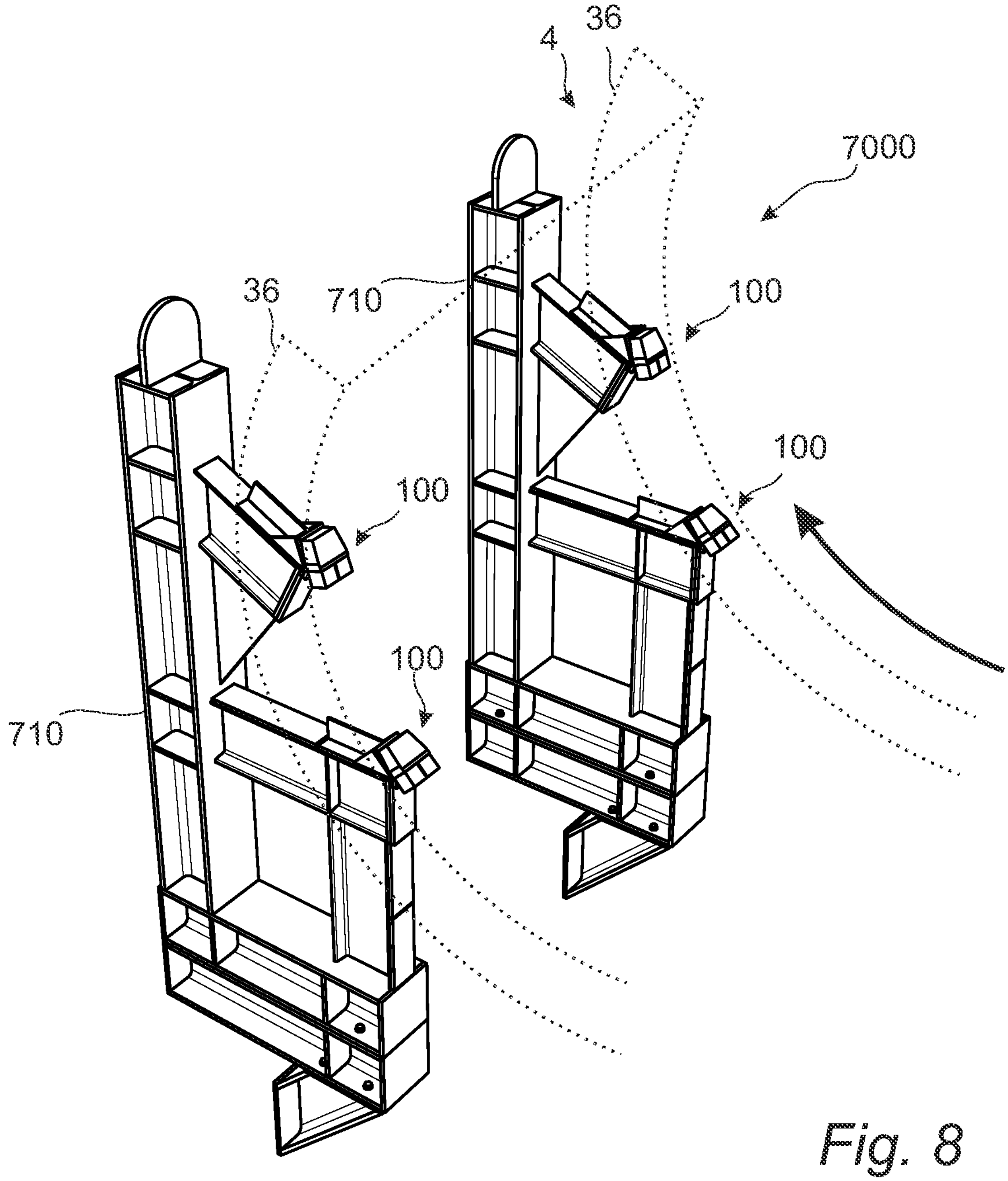
FIG. 8 is a perspective view of two pairs of consecutive scrapers mounted on a common fixture on a roller crusher according to another embodiment of the disclosure.

FIG. 8 illustrates scraper assembly 7000 according to yet another example embodiment. Scraper assembly 7000 comprises four scrapers 100 arranged in pairs along both ends of a roller 3 having dual flanges 36. Each scraper 100 of a pair is arranged consecutively to the other scraper 100 of that pair and may be mounted according to any one of the previously described combinations or any not described combination within the scope of protection of the claims. In particular, the scrapers 100 of a pair may have substantially the same minimum roller surface distances S1 and/or minimum flange distances S2 or may have different minimum roller surface distances S1 and/or minimum flange distances S2. The scrapers 100 are each mounted onto a support structure 710, which in turn is mounted onto the frame of the roller crusher. As readily appreciated by the person skilled in the art, the scraper assembly 7000 is structured and arranged to be located at about 6 to 9 o'clock of the roller 4, when viewing the roller 4 from a side showing clockwise rotation.

Figure 9A:
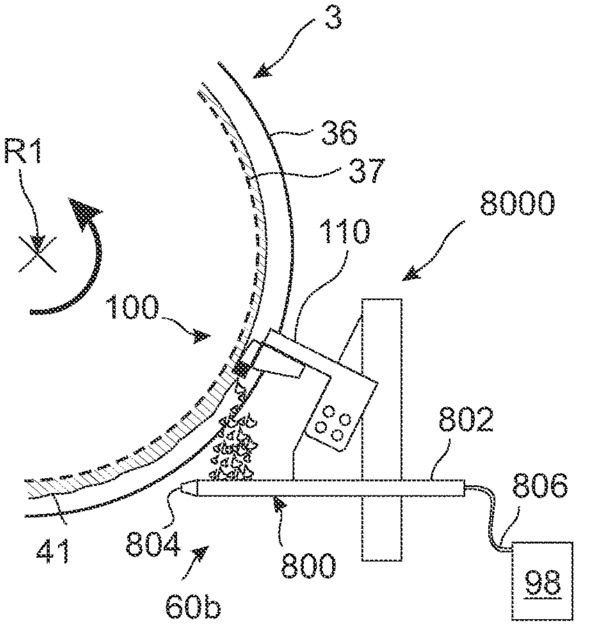
FIG. 9A-C is part-sectional side views of a roller crusher according to another embodiment of the disclosure illustrating a removal of built-up material using an air knife at three consecutive time positions.
Figure 9B:
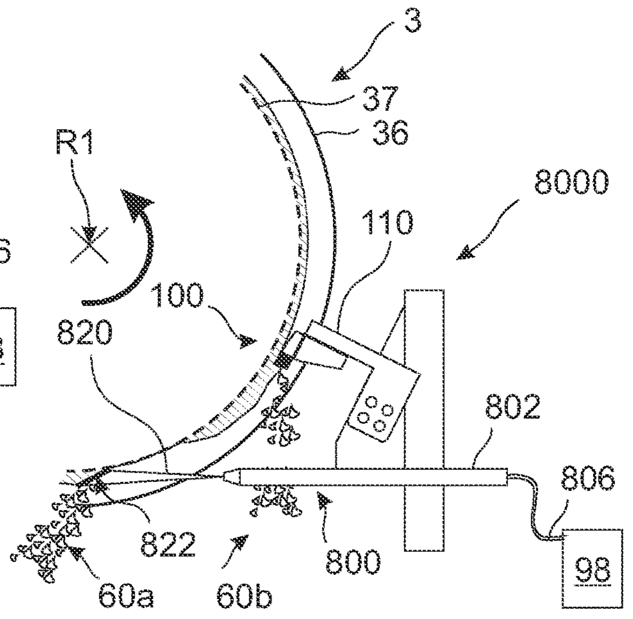
Figure 9C:
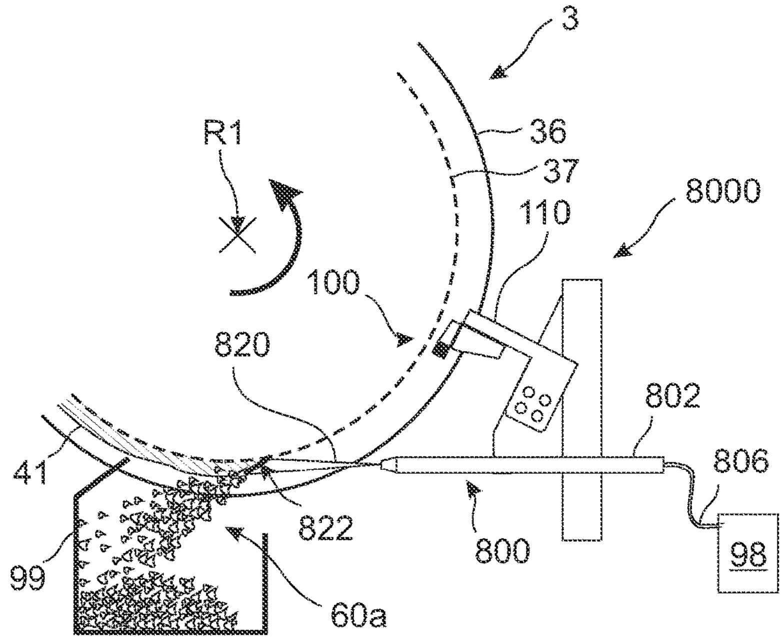

FIG. 9A to C illustrates a scraper assembly 8000 according to another example embodiment. The scraper assembly 8000 comprises a scraper 100 and an air knife 800 arranged consecutive to each other at an end of the roller 3 with a flange 36 for at least partially removing material accumulated on the flange 36 and/or on the outer surface 37 at the end of the roller 3. From here on, scraper 100 will be referred to herein as "mechanical scraper 100" to clearly differentiate the same from the air knife 800 which also removes material but not by mechanical interaction (an air knife could be regarded as a non-contact scraper). The air knife 800 is structured and arranged to, at least intermittently, direct an air plume 820 of pressurised air towards a target area 822 located at the outer surface 37 at the end of the roller 3. The air plume 820 provides a sufficient impact of air at the target area 822 for at least partially removing material accumulated thereon. With the term "intermittently" is here meant that the air knife directs a plume towards the target area at irregular or regular time intervals during operation of the roller crusher. This implies that the air knife may not be in continuous or steady operation. However, for some applications, and some embodiments of the remote material removal device, the device may be in continuous or steady operation.

The air knife 800 comprises a main body 802 having an elongated extension. For the present example embodiment, the main body 802 is arranged substantially horizontally at a lower part of the roller crusher. Pressurised air is supplied to the air knife 800 through tubing 806 which are connected to a high-pressure air supply 98. The air knife 800 will be described in more detail later. As readily appreciated by the person skilled in the art, the efficiency of material removal will depend both on the distance between an exit nozzle of the air knife and the target area 822, and the angle formed between the air plume 820 and the target area 822. The distance may be within the range 50-500 mm from the target area 822.

The air knife 800 is an example of a fluid jet knife, which is an example of a class of devices which are capable of removing material from a distance. These devices are referred to herein as "remote material removal devices". These devices are configured to output a material removing beam towards a target area and be interaction between the material removing beam and material present at said target area, at least partially remove said material. Dependent on the type of remote material removal device, the material is removed by different processes, such as e.g. mechanical impact, heating, ablation, exothermic reactions etc. The fluid jet knives make us of a high-velocity fluid to remove material by impact. Other examples of remote material removal devices are lasers which may be used to remove material by laser heating and material ablation. Although the example embodiments disclosed herein are mainly focused on air knives, the inventive concept should not be construed as limited thereto, and it is envisaged that any suitable alternative remote material removal device may be used instead of an air knife in any of the example embodiments.

As illustrated in FIG. 9A, the target area 822 of the air knife 800 is located in front of the mechanical scraper 100. This means that, when in operation, the build-up material 41 at the flange 36 will encounter the target area 822 of the air knife 800 before encountering the mechanical scraper 100. Although the inventive concept is not limited to this particular order, it is regarded as a preferred order, because the air knife 800 can then be used to remove extra hard and/or excessive amounts of build-up material 41 at the flange 36 before said material impinges onto the mechanical scraper 100. As readily appreciated by the person skilled in the art, this reduces the risk of structural damage of the mechanical scraper 100.

An advantage of the air knife 800 over the mechanical scraper 100 is that the air knife 800 allows controlling. This advantage is equally well applicable for other remote material removal devices, such as fluid jet knives and lasers. Thus, the air knife may be used only at specific positions in time where it is most needed. For the purpose, the air knife 800 may be connected to a control system. The control system may be or form a part of a control system 80 for the roller crusher (illustrated as control system 80 in FIG. 12), a control system of the scraper assembly 8000, or even an external system such as a common control system at the plant. As the roller crusher is started up with clean rollers 3, 4 without any build-up material 41 at the flanges 36, 36', material will, during a first time period of crushing operation, accumulate in the corner transition between the roller surface 37 and the flange 36 so as to create a material build-up 41. During the first time period after startup, such as e.g. the first hour in operation, the material buildup 41 will be relatively soft through the depth of the material, and the mechanical scraper 100 will therefore be able to remove any excess buildup effectively at an acceptable wear rate of the mechanical scraper 100 and acceptable mechanical stress levels on the holding fixture 110 keeping the mechanical scraper 100 in place in relation to the roller crusher. This time period and the operation of the scraper assembly 8000 during the same is illustrated in FIG. 9A.

After continuous operation of the roller crusher during a longer time period, the material buildup 41 will get increasingly more compacted and thus harden through the depth of the material. This will increase the wear rate of the mechanical scraper 100 as well as the mechanical stress levels on the holding fixture 110, thus increasing the risk of damaging the mechanical scraper 100. This problem may be solved by removing buildup material before it has become too hard by means of the air knife 800. By applying an air plume 820 onto the target area 822 located at an end of the roller 3 with a flange 36, the air plume 820 may remove, in part or in full, the material build-up 41 located there. By removing the material build-up 41, the wear life of the mechanical scraper 100 and its holding fixture 110 will be increased, thus providing a more reliable system for keeping build-up material 41 at the flange within acceptable levels. This is illustrated in FIGS. 8B and C showing the onset of (FIG. 9B) and last phase of (FIG. 9C) a substantially complete removal of the particle build-up 41 using the air knife 800. As indicated in FIG. 9C, the removed material 60*a* may be guided into a dedicated container 99. The contained 99 may be advantageous as it allows reducing dust cloud formation at the roller crusher when using the air knife.

Figure 12:
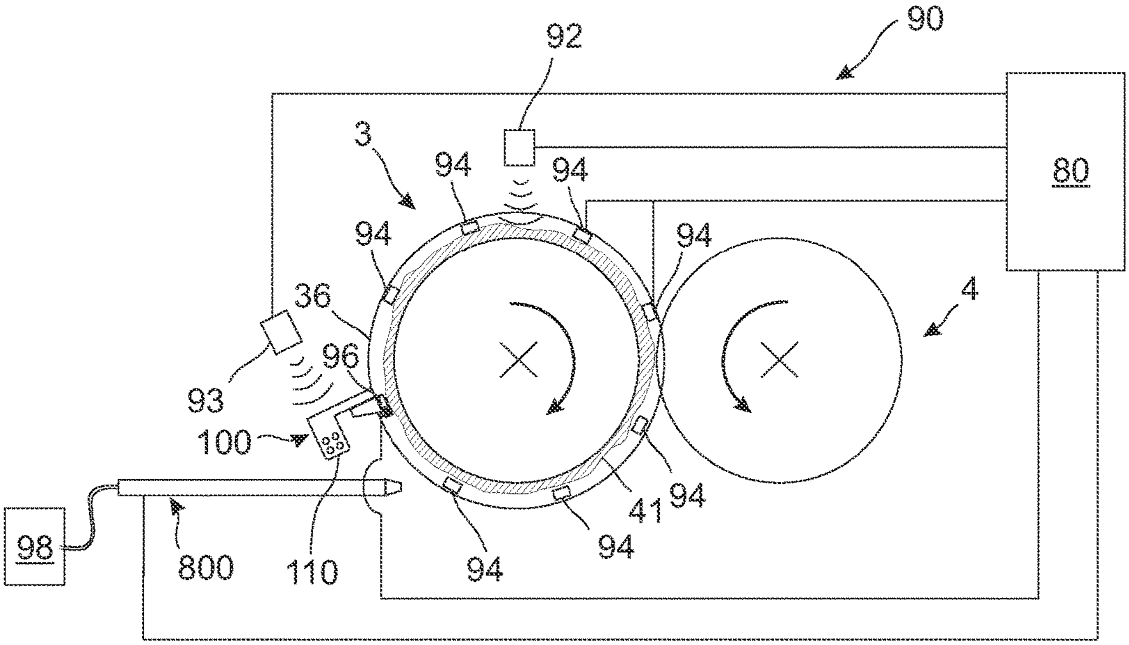
FIG. 12 is a schematic side view of a monitoring system for a roller crusher.

The air knife 800 may be operably connected to a control unit. In an example embodiment, the air knife 800 is operably connected to a control unit 80 of the roller crusher. This is illustrated in FIG. 12. The air knife 800 may be controlled in different ways. For example, the air knife 800 may be turned on within predetermined time ranges, such as e.g. every $3^{rd}$, $4^{th}$, or $5^{th}$ revolution of the roller 3. Alternatively, the air knife 800 may be turned on at time positions determined by roller crusher monitoring system data pertaining to the build-up level of material accumulated on the flange 36 and/or on the outer surface 37 at the end of the roller 3. Such roller crusher monitoring system data may be obtained by means of a monitoring system 90 of the roller crusher, as will be further described later. It is also preferred to turn on the air knife 800 during a time period prior to shut-down of the roller crusher for allowing removing material accumulated on the flange 36 and/or on the outer surface 37 at the end of the roller 3. By removing the accumulated build-up material 41 prior to shut-down, maintenance of the mechanical scrapers (such as scraper 100), such as replacing, adjusting or inspecting the same, will be easier.

Figure 10:
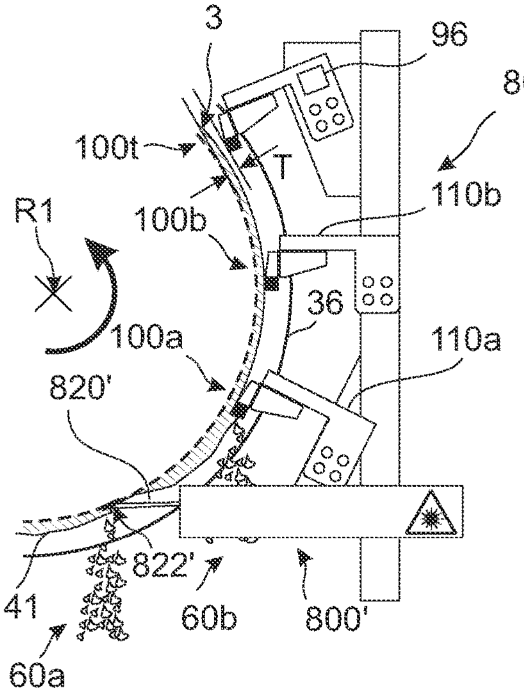
FIG. 10 is a part-sectional side views of a roller crusher according to another embodiment of the disclosure.

Within the inventive concept there are several conceivable combinations of mechanical scrapers and remote material removing devices. Specifically, any combination of mechanical scrapers discussed with reference to FIGS. 4 to 8 may be combined with a remote material removing device such as e.g. an air scraper. Serving as non-limiting examples only, FIG. 10 illustrates a scraper assembly 8000' according to an alternative example embodiment. The scraper assembly 8000' differs from scraper assembly 8000 of FIG. 9 in the following: Firstly, instead of a single mechanical scraper, scraper assembly 8000' has three consecutively arranged scrapers 100*a*, 100*b* and 100*t*, of which the first two scrapers 100*a*, 100*b* are working scrapers and the last scraper 100*t* is a trigger scraper. The functionality of the trigger scraper 100*t* has been detailed with reference to FIG. 4C and will not be repeated here. The two working scrapers 100*a*, 100*b* are arranged similarly to the ones previously described with reference to FIG. 4A, i.e. such that the minimum roller surface distance S1 for scraper 100*a* is substantially the same as the minimum roller surface distance S1 for scraper 100*b*. A further difference is that instead of an air knife, the remote material removing device in scraper assembly 8000' is a high-energy laser. For the example embodiment, a high-energy continuous-wave $CO_2$ laser is used, but other preferably pulsed high-power lasers are also conceivable. The material removing beam, which here thus constitutes laser beam 820', is directed toward the target area 822' and removes build-up material by laser ablation. It may be required to move (i.e. scan) the laser beam during operation to adequately remove the material build-up. This may be achieved by an optical system based on lenses and/or mirrors and are well known in the art.

Figure 11:
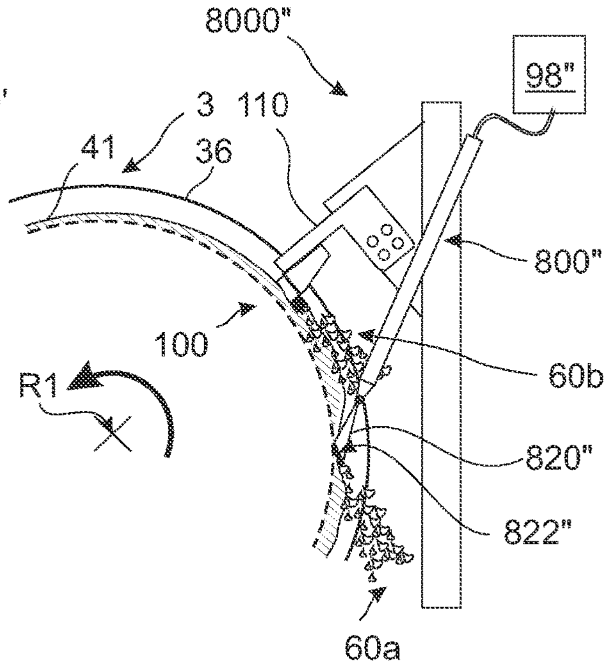
FIG. 11 is a part-sectional side views of a roller crusher according to another embodiment of the disclosure.

FIG. 11 illustrates yet another non-limiting example embodiment, namely scraper assembly 8000". Scraper assembly 8000" differs from scraper assembly 8000 in that the remote material removing device is a water jet knife 800" connected to a pressurized water supply 98" which water jet knife 800" is configured to output a water jet 820" towards target area 822", and that the relative position of the scraper 100 and the water jet knife 800" on the roller crusher is in the region 9 to 12 of the roller, when viewing the roller from a side showing clockwise rotation. An advantage of using a water jet knife over an air jet knife may be reduced dust formation. The advantage of the position may be that the material will be more easily removed from the roller crusher, since the direction of impact is generally downwards—in contrast to the substantially horizontal impact direction of previously described embodiments.

FIG. 12 illustrates a monitoring system 90 for a roller crusher here exemplified in the context of the scraper assembly 8000. In the example, crushing roller 3 has a flange 36 at which build-up material 41 has been accumulated as described in detail earlier. The monitoring system 90 may comprise a controller connected to a series of sensor peripherals. In the example embodiment illustrated in FIG. 12, the control unit 80 of the roller crusher act as control unit also for the monitoring system 90. Specifically, these sensor peripherals may include first monitoring camera 92 arranged to have the build-up material 41 within view. By analyzing the signal transmitted from the first monitoring camera 92, a level of material build-up may be inferred by the control system 80. By allowing the first monitoring camera 92 to view the flange 36, it is also conceivable to infer a degree of flange deformation from an analysis of the signal from the first monitoring camera 92. The monitoring system 90 may further comprise a second monitoring camera 93 arranged to have the scraper 100 and/or the jet plume of the air knife 800 within view. By analyzing the signal transmitted from the second monitoring camera 93, the condition of the scraper 100 and/or the air knife 800 may be inferred by the control system 80. The monitoring system 90 may further comprise a plurality of strain gauges 94 arranged on the flange 36. By analyzing the signal transmitted by the strain gauges 94, the condition of the flange 36 may be monitored. The strain gauges 94 may be arranged to transmit signals wirelessly. The monitoring system 90 may further comprise a strain gauge 96 mounted onto the scraper 100. By analyzing the signal transmitted by the strain gauge 96, the condition of the mechanical scraper 100 may be monitored. Although illustrated here as mounted onto the scraper 100, it is also conceivable to provide a strain gauge on the holding fixture 110.

Figure 13A:
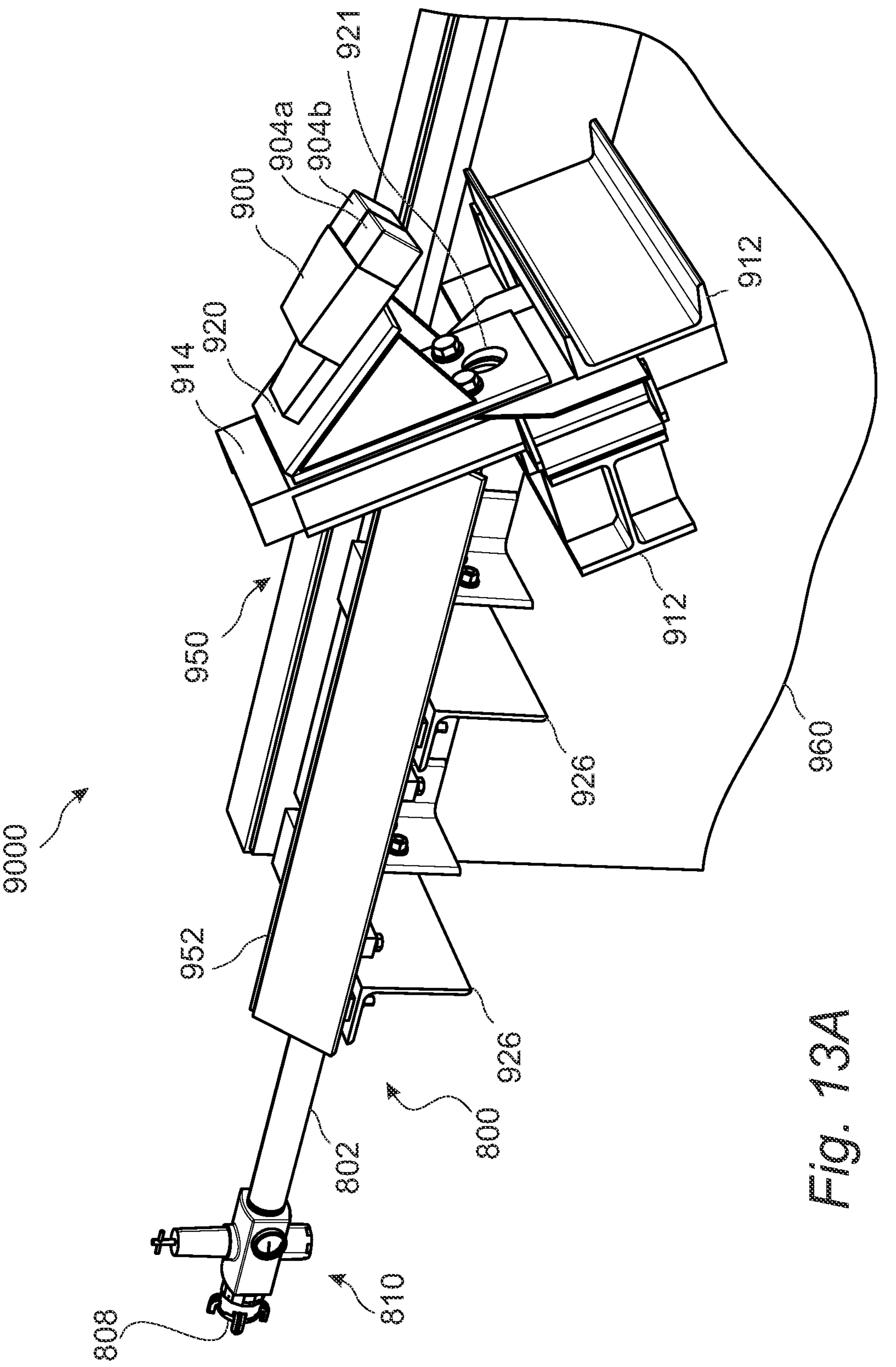
FIG. 13A is a perspective view of a material removal system comprising a mechanical scraper and an air knife according to an embodiment of the disclosure.
Figure 13B:
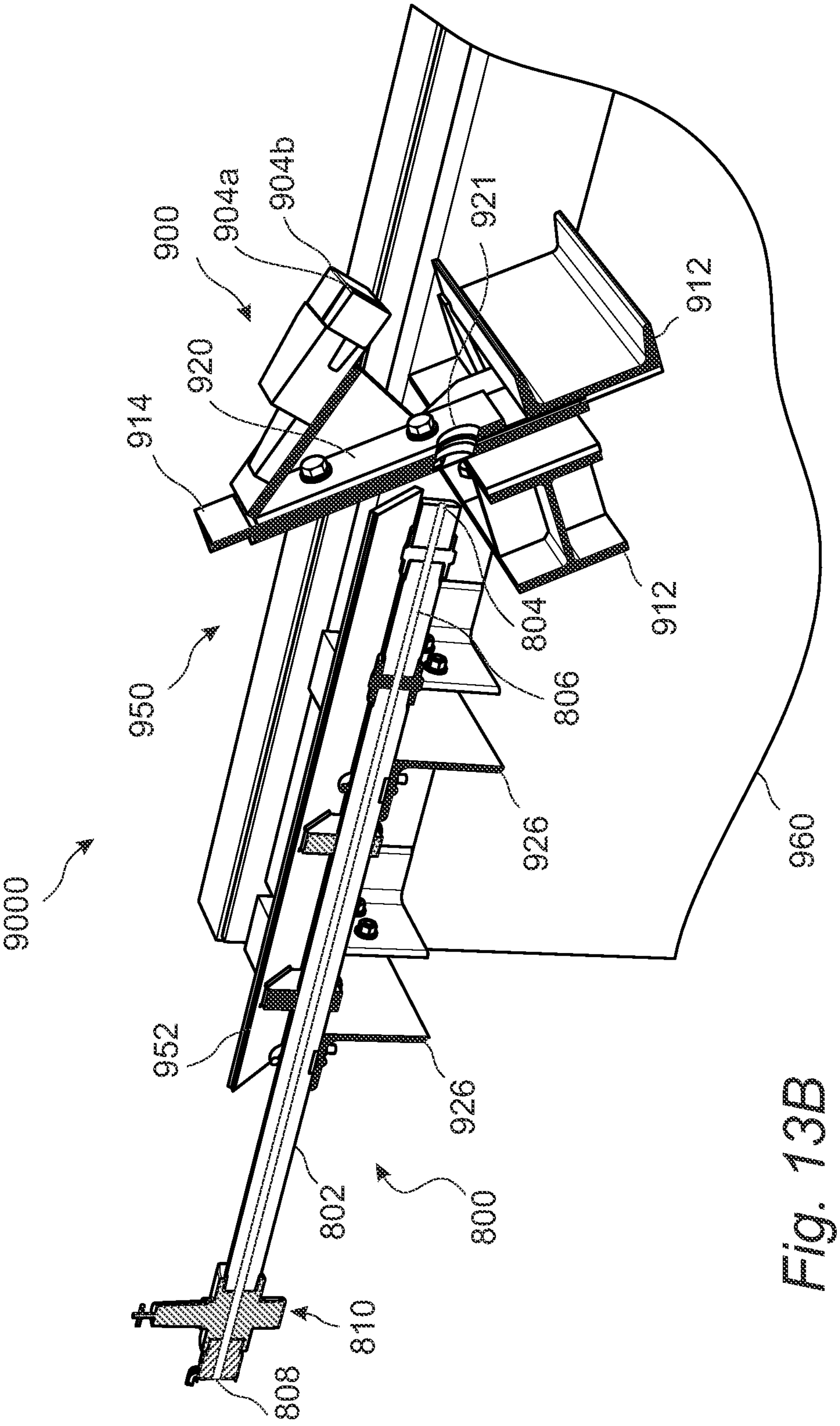
FIG. 13B is a perspective cut-through view of the material removal system of FIG. 13A.
Figure 13C:
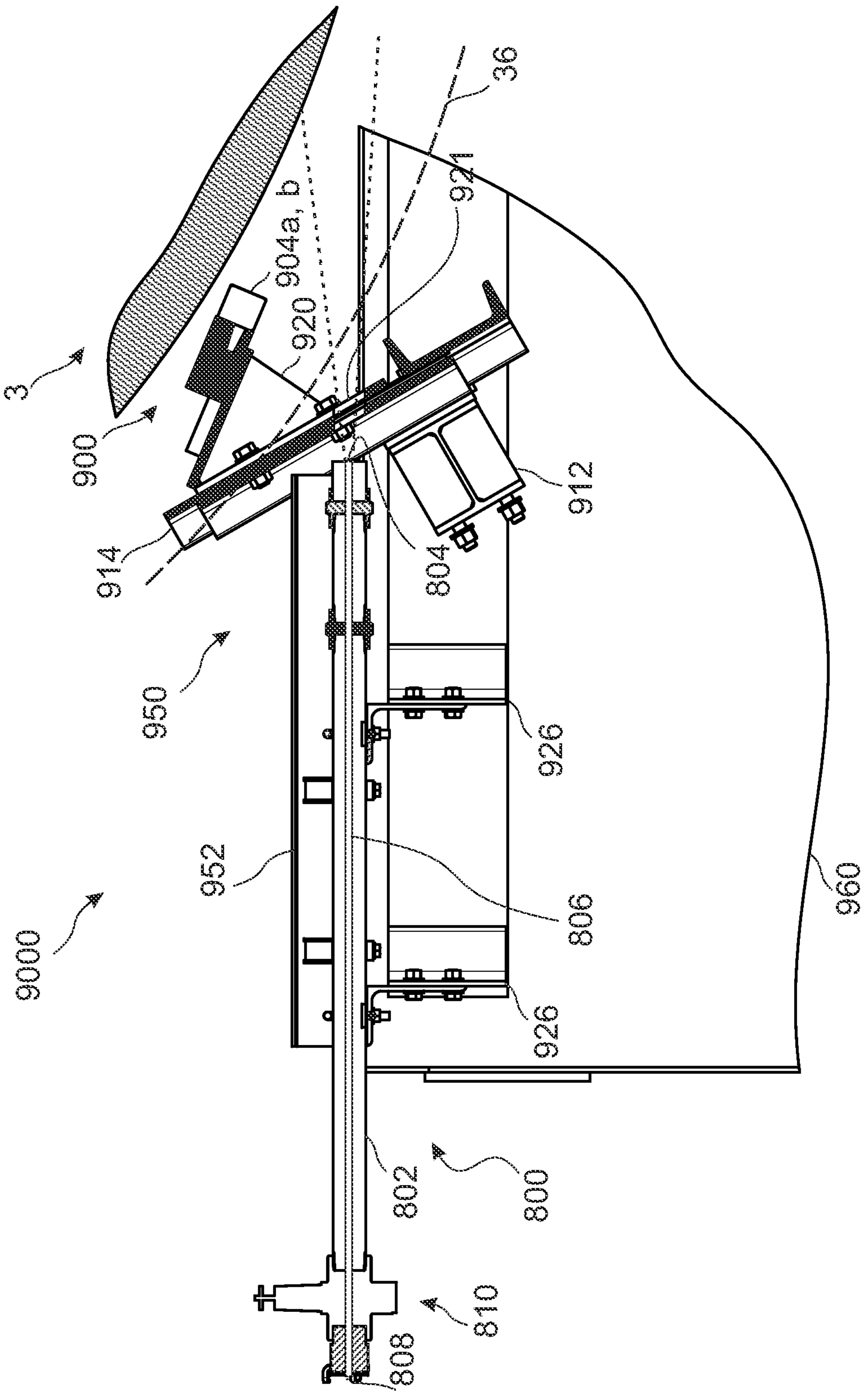
FIG. 13C is a side view of the cut-through illustrated in FIG. 13B together with parts of a roller with a flange.

FIG. 13A to C illustrates a scraper assembly 9000 according to another example embodiment. The scraper assembly 9000 is similar to the scraper assembly 8000 described earlier and is based on a combination of an air knife and a mechanical scraper. However, the scraper assembly 9000 includes some further features which will now be discussed in detail.

The scraper assembly 9000 comprises a scraper 900 having two wear elements 904*a*, 904*b*. Scraper 900 is mounted onto wedge element 920 which is attached to bracket 914 by bolting. Bracket 914 is attached in beams 912 which may be mounted on a frame of the roller crusher. Openings are provided in both wedge element 920 and bracket 914 which when mounted together forms a through-opening 921 in said elements. The purpose of the through-opening 921 is to allow an air plume 820 from the air knife 800 to pass though the structure. The air jet 800 is disposed with its air nozzle 804 located just behind the through-opening 921. As best illustrated in FIGS. 13B and C the air knife 800 includes a pipe 806 which fluidly connects the air nozzle 804 with an air inlet opening 808 located at the opposite end of the air knife body 802. Immediately downstream of the air inlet opening 808, a valve system 810 is provided. The valve system 810 may be controlled from a distance, such as e.g. by a control system as detailed earlier. The air knife 800 is attached to a supporting structure 960 of the roller crusher by means of beams 926.

The scraper assembly further comprises a wear-protective arrangement 950 for protecting the air knife 800. For the example embodiment, the wear protective arrangement includes two separate features: Firstly, the body 802 of the air knife 800 is protected by a wear guard 952 disposed on top of the main body 802. The wear guard 952 presents an angled top surface for allowing falling material to be deflected away from the air knife 800. Secondly, the air nozzle 804 of the air knife 800 is protected by means of the bracket 914 and the wedge element 920. As said elements are disposed very close to the air nozzle 804, they will act as a shield for the air nozzle 804, thus protecting the same from foreign objects such as falling crushing material or the like. The through-opening 921 allows for the air plume 820 to pass the wear-protective structure as best illustrated in FIG. 13C.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed, from a study of the drawings, the disclosure, and the appended claims.

EMBODIMENTS

Embodiment 1. A roller crusher having two generally parallel rollers arranged to rotate in opposite directions, towards each other, and separated by a gap, each roller having two ends, the roller crusher comprising:

a flange attached to at least one of the ends of one of the rollers, the flange extending in a radial direction of the roller, the flange having a height (H) above an outer surface of the roller, wherein the roller crusher further comprises at least one mechanical scraper and a remote material removal device configured to output a material removing beam towards a target area, wherein the at least one mechanical scraper and the remote material removal device are arranged consecutive to each other at an end of the roller with a flange for at least partially removing material accumulated on the flange and/or on the outer surface at the end of the roller.

Embodiment 2. The roller crusher as claimed in Embodiment 1, wherein the at least one mechanical scraper and the remote material removal device are arranged at a lower part of the roller crusher.

Embodiment 3. The roller crusher as claimed in Embodiment 1 or 2, wherein the at least one mechanical scraper is arranged such that a scraping surface of the at least one scraper at least partly face downwards for allowing removed material to leave from the roller and scraping surface by gravitational force.

Embodiment 4. The roller crusher as claimed in any one of Embodiment 1 to 3, wherein the remote material removal device is a fluid jet knife.

Embodiment 5. The roller crusher as claimed in Embodiment 4, wherein the fluid jet knife device is an air knife.

Embodiment 6. The roller crusher as claimed in any one of Embodiment 1 to 5, wherein the target area of the remote material removal device is located in front of the at least one mechanical scraper.

Embodiment 7. The roller crusher as claimed in any one of Embodiment 1 to 6, wherein the material removing beam is directed opposite to a tangential velocity of the roller at the target area.

Embodiment 8. The roller crusher as claimed in any one of Embodiment 1 to 7, wherein the roller crusher further comprises a wear-protective arrangement for the remote material removal device.

Embodiment 9. The roller crusher as claimed in Embodiment 8, wherein the wear-protective arrangement has an opening through which the material removing beam of the remote material removal device exits.

Embodiment 10. The roller crusher as claimed in Embodiment 8 or 9, wherein the wear-protective arrangement further comprises a wear guard for protecting a body of the remote material removal device.

Embodiment 11. The roller crusher as claimed in any one of Embodiment 1 to 10, wherein the scraping surface of the at least one mechanical scraper is arranged such that a distance between the outer surface of the roller and the scraping surface decreases towards the flange.

Embodiment 12. The roller crusher as claimed in any one of Embodiment 1 to 11, wherein the at least one scraper has a fastening position located at a distance from the outer surface of the roller, wherein the at least one scraper is arranged such that a position of a scraping surface of the at least one scraper is located at, or consecutive to, a radial axis which extends from a rotational axis of the roller and through the fastening position.

Embodiment 13. The roller crusher as claimed in Embodiment 9, wherein the target area of the remote material removal device is located in front of the at least one mechanical scraper and wherein the roller crusher further comprises a holding fixture for the at least one mechanical scraper which holding fixture has the opening through which the material removing beam of the remote material removal device exits and which holding fixture forms part of the wear-protective arrangement.

Embodiment 14. The roller crusher as claimed in any one of Embodiment 1 to 13, wherein the remote material removal device is arranged on the roller crusher such that a direction of the material removing beam is adjustable.

Embodiment 15. The roller crusher as claimed in any one of Embodiment 1 to 14, wherein the roller crusher further comprises a controller configured to control operation of the remote material removal device to allow intermittently removing material accumulated on the flange and/or on the outer surface at the end of the roller by means of the remote material removal device.

Embodiment 16. The roller crusher as claimed in Embodiment 15, wherein the roller crusher further comprises a roller crusher monitoring system configured to determine roller crusher monitoring system data pertaining to the build-up level of material accumulated on the flange and/or on the outer surface at the end of the roller, and wherein the controller is configured to control operation of the remote material removal device based on said roller crusher monitoring system data.

Embodiment 17. The roller crusher as claimed in Embodiment 16, wherein the roller crusher monitoring system comprises one or more from:

- at least one monitoring camera arranged to monitor the at least one mechanical scraper and/or the remote material removal device,
- at least one strain gage arranged on the at least one mechanical scraper and/or on a scraper fixture, and
- at least one strain gage arranged on the flange.

Embodiment 18. A method for operating a roller crusher for grinding granular material, wherein the roller crusher has two generally parallel rollers arranged to rotate in opposite directions, towards each other, and separated by a gap, each roller having two ends, the roller crusher comprising:

- a flange attached to at least one of the ends of one of the rollers,
- the flange extending in a radial direction of the roller,
- the flange having a height (H) above an outer surface of the roller, wherein the roller crusher further comprises at least one mechanical scraper and a remote material removal device configured to transmit a material removing beam towards a target area, wherein the at least one mechanical scraper and the remote material removal device are arranged consecutive to each other at an end of the roller with a flange, wherein the method comprises at least the steps of:
- a) at least partially removing material accumulated on the flange and/or on the outer surface at the end of the roller by means of the at least one mechanical scraper; and
- b) at least partially removing material accumulated on the flange and/or on the outer surface at the end of the roller by means of the remote material removal device,
- wherein step a) is performed continuously and wherein step b) is performed at least intermittently.

Embodiment 19. The method as claimed in Embodiment 18, wherein step a) results in a first thickness of accumulated material remaining on the flange and/or on the outer surface at the end of the roller, and step b) results in a second thickness of accumulated material remaining on the flange and/or on the outer surface at the end of the roller, and wherein the first thickness is larger than the second thickness.

Embodiment 20. The method as claimed in Embodiment 18 or 19, wherein step b) is performed within predetermined time ranges.

Embodiment 21. The method as claimed in any one of Embodiment 18 to 20, wherein the at least one mechanical scraper comprises a trigger scraper positioned at a maximum tolerable distance from the roller surface and/or inner surface of the flange, which trigger scraper is configured to initiate step b) upon impact with accumulated material remaining on the flange and/or on the outer surface at the end of roller.

Embodiment 22. The method as claimed in any one of Embodiment 18 to 21, wherein step b) is performed at time positions determined by roller crusher monitoring system data pertaining to the build-up level of material accumulated on the flange and/or on the outer surface at the end of the roller.

Embodiment 23. The method as claimed in any one of Embodiment 18 to 22, wherein step b) is performed prior to shut-down of the roller crusher for allowing removing material accumulated on the flange and/or on the outer surface at the end of the roller for facilitating replacement of the at least one mechanical scraper.

The invention claimed is:

1. A roller crusher having two parallel rollers arranged to rotate in opposite directions, towards each other, and separated by a gap, each roller having two ends, the roller crusher comprising:

- a flange attached to at least one of the ends of one of the rollers,
- the flange extending in a radial direction of the roller,
- the flange having a height (H) above an outer surface of the roller, wherein the roller crusher further comprises at least one mechanical scraper and a remote material removal device configured to output a material removing beam towards a target area, wherein the at least one mechanical scraper and the remote material removal device are arranged consecutive to each other at an end of the roller with the flange for at least partially removing material accumulated on the flange and/or on the outer surface at the end of the roller.

2. The roller crusher as claimed in claim 1, wherein the at least one mechanical scraper and the remote material removal device are arranged at a lower part of the roller crusher.

3. The roller crusher as claimed in claim 1, wherein the at least one mechanical scraper is arranged such that a scraping surface of the at least one scraper at least partly face downwards for allowing removed material to leave from the roller and scraping surface by gravitational force.

4. The roller crusher as claimed in claim 1, wherein the remote material removal device is a fluid jet knife.

5. The roller crusher as claimed in claim 4, wherein the fluid jet knife device is an air knife.

6. The roller crusher as claimed in claim 1, wherein the target area of the remote material removal device is located in front of the at least one mechanical scraper.

7. The roller crusher as claimed in claim 1, wherein the material removing beam is directed opposite to a tangential velocity of the roller at the target area.

8. The roller crusher as claimed in claim 1, wherein the roller crusher further comprises a wear-protective arrangement for the remote material removal device.

9. The roller crusher as claimed in claim 8, wherein the wear-protective arrangement has an opening through which the material removing beam of the remote material removal device exits.

10. The roller crusher as claimed in claim 8, wherein the wear-protective arrangement further comprises a wear guard for protecting a body of the remote material removal device.

11. The roller crusher as claimed in claim 1, wherein the scraping surface of the at least one mechanical scraper is arranged such that a distance between the outer surface of the roller and the scraping surface decreases towards the flange.

12. The roller crusher as claimed in claim 1, wherein the at least one scraper has a fastening position located at a distance from the outer surface of the roller, wherein the at least one scraper is arranged such that a position of a scraping surface of the at least one scraper is located at, or consecutive to, a radial axis which extends from a rotational axis of the roller and through the fastening position.

13. The roller crusher as claimed in claim 9, wherein the target area of the remote material removal device is located in front of the at least one mechanical scraper and wherein the roller crusher further comprises a holding fixture for the at least one mechanical scraper which holding fixture has the opening through which the material removing beam of the remote material removal device exits and which holding fixture forms part of the wear-protective arrangement.

14. The roller crusher as claimed in claim 1, wherein the remote material removal device is arranged on the roller crusher such that a direction of the material removing beam is adjustable.

15. The roller crusher as claimed in claim 1, wherein the roller crusher further comprises a controller configured to control operation of the remote material removal device to allow intermittently removing material accumulated on the flange and/or on the outer surface at the end of the roller by means of the remote material removal device.

16. The roller crusher as claimed in claim 15, wherein the roller crusher further comprises a roller crusher monitoring system configured to determine roller crusher monitoring system data pertaining to the build-up level of material accumulated on the flange and/or on the outer surface at the end of the roller, and wherein the controller is configured to control operation of the remote material removal device based on said roller crusher monitoring system data.

17. The roller crusher as claimed in claim 16, wherein the roller crusher monitoring system comprises one or more from:

at least one monitoring camera arranged to monitor the at least one mechanical scraper and/or the remote material removal device, at least one strain gage arranged on the at least one mechanical scraper and/or on a scraper fixture, and at least one strain gage arranged on the flange.

18. A method for operating a roller crusher for grinding granular material, wherein the roller crusher has two parallel rollers arranged to rotate in opposite directions, towards each other, and separated by a gap, each roller having two ends, the roller crusher comprising:

a flange attached to at least one of the ends of one of the rollers, the flange extending in a radial direction of the roller, the flange having a height (H) above an outer surface of the roller, wherein the method comprises at least the steps of:

a) providing at least one mechanical scraper and a remote material removal device consecutive to each other at an end of the roller with the flange, the remote material removal device configured to transmit a material removing beam toward a target area;

b) utilizing the at least one mechanical scraper to at least partially remove material accumulated on the flange and/or on the outer surface at the end of the roller; and c) utilizing the remote material removal device to at least partially remove material accumulated on the flange and/or on the outer surface at the end of the roller, wherein step b) is performed continuously and wherein step c) is performed at least intermittently.

19. The method as claimed in claim 18, wherein step b) results in a first thickness of accumulated material remaining on the flange and/or on the outer surface at the end of the roller, and step c) results in a second thickness of accumulated material remaining on the flange and/or on the outer surface at the end of the roller, and wherein the first thickness is larger than the second thickness.

20. The method as claimed in claim 18, wherein step c) is performed within predetermined time ranges.

21. The method as claimed in claim 18, wherein the at least one mechanical scraper comprises a trigger scraper positioned at a maximum tolerable distance from the roller surface and/or inner surface of the flange, which trigger scraper is configured to initiate step c) upon impact with accumulated material remaining on the flange and/or on the outer surface at the end of roller.

22. The method as claimed in claim 18, wherein step c) is performed at time positions determined by roller crusher monitoring system data pertaining to the build-up level of material accumulated on the flange and/or on the outer surface at the end of the roller.

23. The method as claimed in claim 18, wherein step c) is performed prior to shut-down of the roller crusher for allowing removing material accumulated on the flange and/or on the outer surface at the end of the roller for facilitating replacement of the at least one mechanical scraper.

* * * * *